United States Patent
Higashi et al.

(10) Patent No.: US 9,332,161 B2
(45) Date of Patent: May 3, 2016

(54) MOVING IMAGE REGION DETERMINATION DEVICE AND METHOD THEREOF

(71) Applicant: EIZO Corporation, Ishikawa (JP)

(72) Inventors: Masafumi Higashi, Ishikawa (JP); Masashi Nakao, Ishikawa (JP); Hiroki Matsuzaki, Ishikawa (JP); Haifeng Chen, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 14/390,225

(22) PCT Filed: Dec. 20, 2012

(86) PCT No.: PCT/JP2012/082992
§ 371 (c)(1),
(2) Date: Oct. 2, 2014

(87) PCT Pub. No.: WO2013/150689
PCT Pub. Date: Oct. 10, 2013

(65) Prior Publication Data
US 2015/0077638 A1    Mar. 19, 2015

(30) Foreign Application Priority Data

Apr. 3, 2012 (JP) .................................. 2012-084660
Jun. 29, 2012 (JP) .................................. 2012-146851

(51) Int. Cl.
*H04N 5/14* (2006.01)
*G06T 7/20* (2006.01)
*H04N 7/01* (2006.01)

(52) U.S. Cl.
CPC .............. *H04N 5/144* (2013.01); *G06T 7/2006* (2013.01); *G06T 2207/20021* (2013.01); *H04N 7/0117* (2013.01); *H04N 7/0137* (2013.01)

(58) Field of Classification Search
CPC ................. G06T 2207/20021; G06T 7/2006; H04N 5/144; H04N 7/0117; H04N 7/0137
See application file for complete search history.

(56) References Cited

U.S. PATENT DOCUMENTS 5,588,067 A * 12/1996 Peterson ................ H04N 7/188
                                                              348/154
7,433,493 B1 * 10/2008 Miyoshi ............. G06K 9/00771
                                                              348/E7.087

(Continued)

FOREIGN PATENT DOCUMENTS

| JP | 11-7266 A | 1/1999 |
| JP | 2000-082146 A | 3/2000 |
| JP | 2009-64199 A | 3/2009 |

OTHER PUBLICATIONS

International Search Report dated Feb. 5, 2013 from corresponding International Patent Application No. PCT/JP2012/082992; 2 pgs.

(Continued)

*Primary Examiner* — Amy Hsu
(74) *Attorney, Agent, or Firm* — Maier & Maier, PLLC

(57) ABSTRACT

A rectangular moving region is properly determined. A retainer retains an outputted moving region of time t and, at time t+1, provides it to a specified region feature detector. At time t+1, the specified region feature detector applies the moving coordinates of time t provided by the judgment unit to respective images of times t and t+1 to calculate feature data d(t) around the moving coordinates of time t and feature data d(t+1) around the moving coordinates of time t+1 and then provides the calculated data to a judgment unit. The judgment unit judges whether there is a box, based on the feature data d(t+1).

15 Claims, 26 Drawing Sheets

1: RECTANGULAR MOVING IMAGE
REGION DETERMINATION APPARATUS

(56) References Cited

U.S. PATENT DOCUMENTS

| | | | |
|---|---|---|---|
| 2003/0210807 A1* | 11/2003 | Sato | G06T 7/2006 382/104 |
| 2007/0223818 A1* | 9/2007 | Marik | G06K 9/00664 382/218 |
| 2008/0219527 A1* | 9/2008 | Lavi | G06T 7/0083 382/128 |
| 2010/0026904 A1* | 2/2010 | Higuchi | H04N 5/145 348/700 |
| 2011/0228092 A1* | 9/2011 | Park | G06K 9/00771 348/154 |
| 2011/0228985 A1* | 9/2011 | Uchida | G06T 7/2006 382/103 |
| 2012/0300046 A1* | 11/2012 | Blayvas | G02B 27/0093 348/54 |

OTHER PUBLICATIONS

Extended European Search Report dated Jan. 5, 2016, including the Supplementary European Search Report and the European Search Opinion, in connection with corresponding EP Application No. 12873525 (11 pgs.).

P. Shih, et al., "Face Detection Using Discriminating Feature Analysis and Support Vector Machine in Video"Proceedings of the 17th International Conference on Pattern Recognition, vol. 2, No. 23, Aug. 23, 2004, pp. 107-410 (4 pgs.).

S-Y Chien, et al., "Efficient Moving Object Segmentation Algorithm Using Background Registration Technique", IEEE Transactions on Circuits and Systems for Video Technology, vol. 12, No. 7, Jul. 2002, pp. 577-586 (10 pgs.).

* cited by examiner

<MOVING IMAGE REGION DETERMINATION PROCESS (CONTINUED)>

HORIZONTAL FILTER

$mask\_x = \begin{bmatrix} -1 & -1 & -1 \\ +1 & +1 & +1 \end{bmatrix}$

HORIZONTAL EDGE

$edge\_x = (|Y*mask\_x| + 2*|Cb*mask\_x| + 2*|Cr*mask\_x|) TH1) \& (|Y*mask\_y| + 2*|Cb*mask\_y| + 2*|Cr*mask\_y|) TH2)$

B

VERTICAL FILTER

$mask\_y = \begin{bmatrix} -1 & +1 \\ -1 & +1 \\ -1 & +1 \end{bmatrix}$

VERTICAL EDGE

$edge\_y = (|Y*mask\_y| + 2*|Cb*mask\_y| + 2*|Cr*mask\_y|) TH1) \& (|Y*mask\_x| + 2*|Cb*mask\_x| + 2*|Cr*mask\_x|) TH2)$

A

EDGE FRAME t

B

EDGE FRAME t+1

C

EDGE FRAME t+2

MOVING IMAGE REGION DETERMINATION DEVICE AND METHOD THEREOF

TECHNICAL FIELD

The present invention relates to a method for determining a moving image region and in particular to a method for determining a rectangular moving image region.

BACKGROUND ART

Nowadays, attention is being paid to a technology that increases the resolution of an input moving image signal or still image signal and outputs the resulting signal. For example, if only the resolution of the moving image region can be increased in the display region, even a coarse input moving image can be displayed with improved viewability.

If such a moving image region is fixed, it can be identified manually. However, the identification process is troublesome. Of course, if the moving image region moves, there is a limit to identifying it manually.

There have been proposed various methods for identifying a moving image region. For example, Patent Document 1 discloses a method for determining a motion on a block basis. Specifically, the determination method includes: making a comparison between the gray levels of the same pixel in the preceding and following frames; if there is a difference between the gray levels, judging that the pixel is a moving-image pixel; obtaining the ratio of the number of the moving-image pixels to the number of all the pixels on a block basis; and if the ratio is greater than the threshold, judging that the block is a moving-image block.

PRIOR ART DOCUMENTS

Patent Documents

Patent Document 1: Japanese Unexamined Patent Application Publication No. 11-007266

SUMMARY OF THE INVENTION

Problems to be Solved by the Invention

However, in the determination method disclosed in Patent Document 1, a comparison is made for each pixel and then the number of pixels is counted for each block. Accordingly, it is necessary to make a comparison for each of all pixels in one frame, which would increase cost or design difficulty.

The present invention has been made to solve the above problem, and an object thereof is to provide a method and apparatus for determining a rectangular moving image region using a simple configuration.

Means for Solving the Problems (1) The present invention provides a method for determining boundaries of a rectangular moving image region having a rectangular external shape displayed in part of a display region on the basis of a difference between respective frames of times t and t+n and comprising:

if a rectangular moving image region in the frame of time t is determined, retaining the boundary coordinates of the rectangular moving image region; and judging whether there is a box at the boundary coordinates of the rectangular moving image region of time t in a frame of time t+m, without using the frame of time t and, if there is a box, judging that a region specified by the boundary coordinates of the rectangular moving image region of time t is a moving region in the frame of time t+n, wherein $n \geq m$.

Thus, even when the movement is temporarily stopped in a subsequent frame, it is possible to judge that the region specified by the boundary coordinates of the rectangular moving image region of time t is a moving region in the frame of time t+n.

(2) In the method of the present invention, pixels are arranged in row and column directions in the display region, wherein the rectangular moving image region in the frame of time t is determined by:

a moving unit block judgment step of dividing the display region into unit blocks each including a predetermined number of pixels and judging whether each unit block is a moving unit block having a motion;

a moving column block determination step of defining, as a column block, a set of unit blocks included in a column including one of uppermost unit blocks of the unit blocks and, if one column block includes at least one moving unit block, determining the column block as a moving column block;

a moving row block determination step of defining, as a row block, a set of unit blocks included in a row including one of leftmost unit blocks of the unit blocks and, if one row block includes at least one moving unit block, determining the row block as a moving row block; and a first rectangular moving image region determination step of determining a rectangular region specified by unit blocks included in both the moving row block and the moving column block as a rectangular moving image region.

Thus, it is possible to determine, as a rectangular moving image region, the rectangular region specified by unit blocks included in both the moving row block and the moving column block.

In the method of the present invention, the rectangular moving image region in the frame of time t is further determined by a second rectangular moving image region determination step of determining a region defined by edges of the rectangular moving image region as the rectangular moving image region on the basis of pixels in unit blocks forming peripheral four sides, of the unit blocks forming the rectangular moving image region. Thus, a rectangular moving image region can be determined accurately.

In the method of the present invention, the first rectangular moving image region determination step comprises, if the number of adjacent moving row blocks of the moving row blocks is greater than or equal to a threshold, defining an external row block straight line of the set of adjacent row blocks; if the number of adjacent moving column blocks of the moving column blocks is greater than or equal to a threshold, defining an external column block straight line of the set of adjacent column blocks; and determining a rectangular region surrounded by the external row block straight line and the external column block straight line as a rectangular moving image region. Thus, a rectangular moving image region can be determined.

(5) In the method of the present invention, the second rectangular moving image region determination step comprises determining a row having a different representative pixel value in the unit blocks forming the peripheral four sides as a row-direction boundary of the rectangular moving image region and determining a column having a different representative pixel value in the unit blocks forming the peripheral four sides as a column-direction boundary of the rectangular moving image region. Thus, a rectangular moving image region can be determined accurately.

(6) In the method of the present invention, the second rectangular moving image region determination step comprises extracting pixels forming a row-direction edge and pixels forming a column-direction edge from pixels in the unit blocks forming the peripheral four sides and determining boundaries of the rectangular moving image region on the basis of the total number of pixels forming a row-direction edge in each row and the total number of pixels forming a column-direction in each column. Thus, a rectangular moving image region can be determined accurately.

(7) The method of the present invention further comprises:

if no moving region is detected from the frames of times t and t+n, judging whether there is a box at the boundary coordinates of the rectangular moving image region of time t in a frame of time t+b, without using the frame of time t and, if there is a box, judging that the region specified by the boundary coordinates of the rectangular moving image region of time t is a moving region in the frame of time t+n;

if moving regions are detected from the frames of times t and t+n, determining a rectangular moving image region in the frame of time t+n on the basis of the frames of times t and t+n and judging whether the determined rectangular moving image region in the frame of time t+n is included in the region specified by the boundary coordinates of the rectangular moving image region of time t; and if the determined rectangular moving image region in the frame of time t+n is included, judging whether there is a box at the boundary coordinates of rectangular moving image region of time t in the frame of time t+b, without changing using the frame of time t and, if there is a box, judging that the region specified by the boundary coordinates of the rectangular moving image region of time t is a moving region in the frame of time t+n, wherein b and n are integers satisfying $n \geq b \geq 1$.

Thus, it is possible to determine the region specified by the boundary coordinates of time t in the frame of time t+b as a moving region in the frame of time t+n, without using the frame of time t.

(8) In the method of the present invention, if the number of times the determined rectangular moving image region in the frame of time t+n is continuously included in the region specified by the boundary coordinates of time t is greater than or equal to a threshold, whether there is a box at the boundary coordinates of the rectangular moving image region of time t in the frame of time t+b is judged without using the frame of time t. Thus, if the determined rectangular moving image region in the frame of time t+n is repeatedly included in the region specified by the boundary coordinates of time t, the box judgment can be made.

(9) The present invention also provides an apparatus for determining boundaries of a rectangular moving image region having a rectangular external shape displayed in part of a display region on the basis of a difference between respective frames of times t and t+n and comprising:

means configured to determine a rectangular moving image region in the frame of time t;

boundary coordinate retaining means configured to retain coordinates of boundaries of the determined rectangular moving image region;

box judgment means configured to judge whether there is a box at the boundary coordinates of the rectangular moving image region of time t in a frame of time t+m, without using the frame of time t; and region judgment means configured to, if the box judgment means judges that there is a box, judge that a region specified by the boundary coordinates of the rectangular moving image region of time t is a moving region in the frame of time t+n, wherein $n \geq m$.

Thus, even when the movement is temporarily stopped in a subsequent frame, it is possible to judge that the region specified by the boundary coordinates of the rectangular moving image region of time t is a moving region in the frame of time t+n.

(14) The present invention also provides a method for determining boundaries of a rectangular moving image region having a rectangular external shape displayed in part of a display region on the basis of a difference between respective frames of times t and t+n and comprising:

if a rectangular moving image region of time t+n is determined based on the frames of times t and t+n, retaining coordinates of boundaries of the rectangular moving image region of time t+n;

if a rectangular moving image region in a frame of time t+m is determined based on respective frames of times t+p and t+m, judging whether the rectangular moving image region in the frame of time t+m is included in a region specified by the boundary coordinates of the rectangular moving image region of time t+n;

if the rectangular moving image region in the frame of time t+m is included, judging whether there is a box at the boundary coordinates of the frame of time t+n in a frame of time t+b, without using the frame of time t+n; and if there is a box, judging whether the region specified by the boundary coordinates of time t+n is a moving region in the frame of time t+m, wherein m, n, p, and b are integers satisfying $n<m$, $p<m$, and $b \leq m$.

Thus, it is possible to determine the region specified by the boundary coordinates of time t+n in the frame of time t+b as a moving region in the frame of time t+m, without using the frame of time t+n.

In the present specification, the term "pixel value" refers to the luminance value, as well as all values for specifying image information, including RGB values. The term "rectangular moving image region" refers to a rectangular region where the pixel value varies among multiple frames and which forms a moving image region.

The term "column block" refers to a set of unit blocks included in a column including one of the uppermost unit blocks of the unit blocks. In embodiments, a column block is determined by specifying one of the uppermost unit blocks. Alternatively, a column block may be determined by specifying a unit block in a row other than the uppermost row, as long as the column block consequently includes one of the uppermost unit blocks. The term "row block" refers to a set of unit blocks included in a row including one of the leftmost unit blocks. As with a column block, a unit block may be specified in any manner to determine a row block, as long as the row block consequently includes one of the leftmost unit blocks.

"The first rectangular moving image region determination step" and "the second rectangular moving image region determination step" correspond to a moving image region determination process (step S7 in FIG. 3) and a boundary determination process (step S9 in FIG. 3), respectively, in the embodiments.

The term "row direction" refers to the direction in which the rows are arranged, and corresponds to the direction α in the embodiments. The term "row-direction edge" refers to an edge in a direction parallel to the row direction, and the term "column-direction edge" refers to an edge in a direction parallel to the column direction.

As used herein, "included" refers to cases where all the four sides fall within the past moving region, as shown in FIG. 23, as well as cases where one or two corners of the past moving region are hidden.

BRIEF DESCRIPTION OF THE DRAWINGS

FIGS. 18A and 18B show filters and formulas used to make an edge pixel judgment.

EMBODIMENTS

Embodiments of the present invention will be described with reference to the drawings.

1.1 Function Blocks

Figure 1:
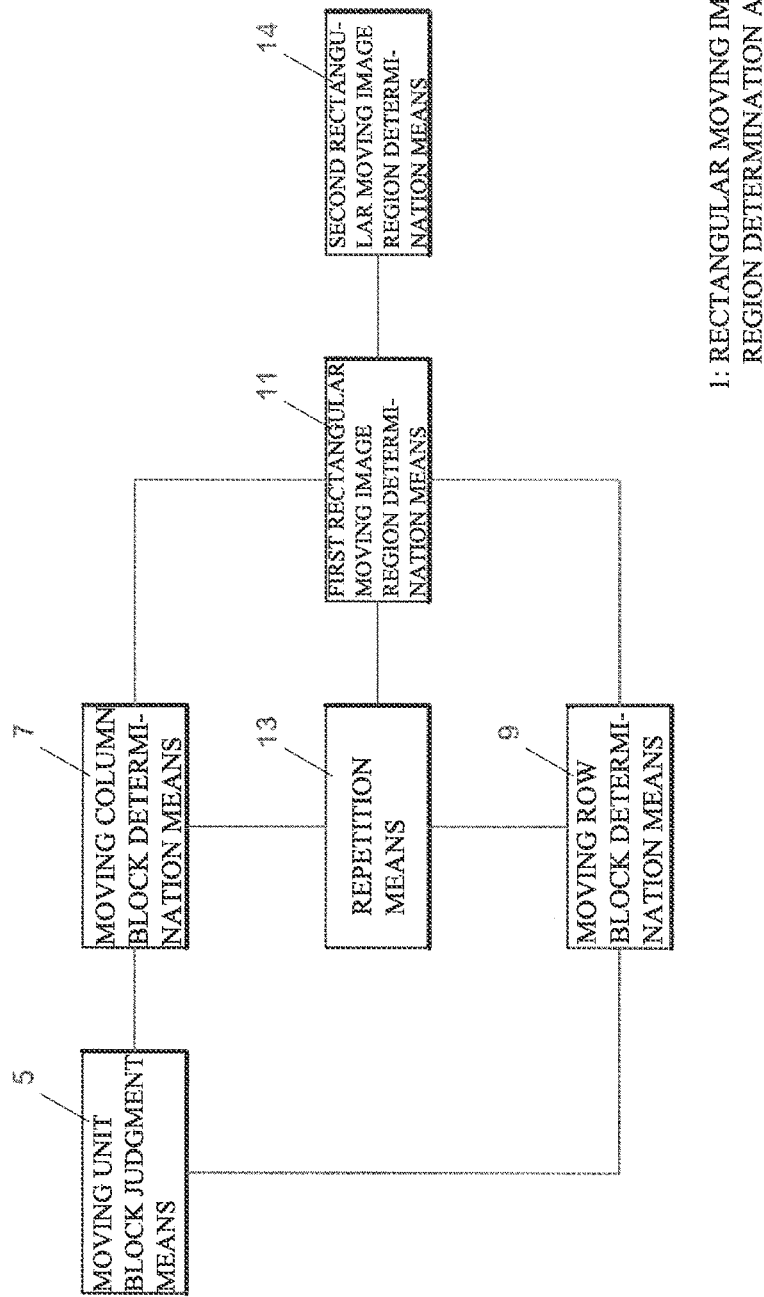
FIG. 1 is a function block diagram of a rectangular moving image region determination apparatus 1.

FIG. 1 shows a function block diagram of a rectangular moving image region determination apparatus 1 of one embodiment of the present invention. The rectangular moving image region determination apparatus 1 is configured to determine a rectangular moving image region displayed in part of a display region having pixels arranged in row and column directions therein. It includes moving unit block judgment means 5, moving column block determination means 7, moving row block determination means 9, first rectangular moving image region determination means 11, repetition means 13, and second rectangular moving image region determination means 14.

The moving unit block judgment means 5 divides the display region into unit blocks each including a predetermined number of pixels and judges whether each unit block is a moving unit block having a motion. The moving column block determination means 7 defines, as a column block, a set of unit blocks included in a column including one of the uppermost unit blocks of the unit blocks and, if one column block includes at least one moving unit block, determines the column block as a moving column block. The moving row block determination means 9 defines, as a row block, a set of unit blocks included in a row including one of the leftmost unit blocks and, if one row block includes at least one moving unit block, determines the row block as a moving row block. The first rectangular moving image region determination means 11 determines, as a rectangular moving image region, a rectangular region specified by unit blocks included in both the moving row block and the moving column block. The repetition means 13 causes the moving column block determination means 7, the moving row block determination means 9, and the first rectangular moving image region determination means 11 to repeatedly perform processes on the rectangular moving image region determined by the first rectangular moving image region determination means 11. Based on pixels in unit blocks forming the peripheral four sides, of the unit blocks forming the rectangular moving image region, the second rectangular moving image region determination means 14 determines a region defined by the edges of the rectangular moving image region as the rectangular moving image region.

1.2 Hardware Configuration

Figure 2:
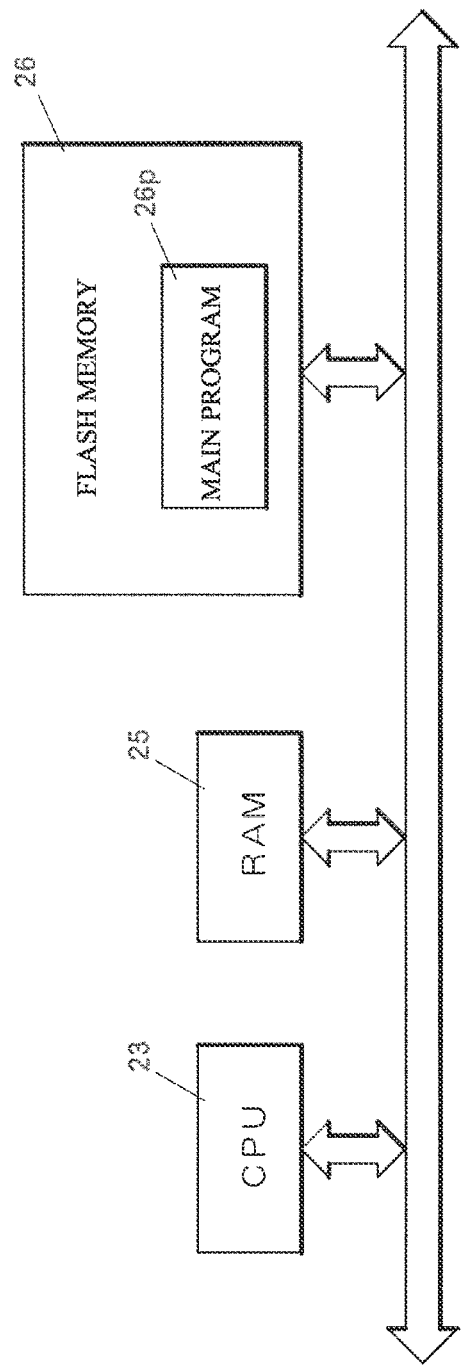
FIG. 2 is a diagram showing an example hardware configuration of the rectangular moving image region determination apparatus 1 including a CPU.

FIG. 2 shows the hardware configuration of the rectangular moving image region determination apparatus 1. The rectangular moving image region determination apparatus 1 includes a CPU 23, a RAM 25, and a flash memory 26. The flash memory 26 stores a program 26p. The program 26p performs a rectangular moving image region determination process, as will be described later. The RAM 25 stores a calculation result or the like. A frame memory 27 stores image data of one screen.

Under the program 26p, the CPU 23 judges whether an image region is a moving image region, which includes moving pixels, on the basis of the values of the pixels forming the display region stored in the memory 27, and then stores the judgment result in the RAM 25.

1.3 Description of Flowchart

A process performed by the program 26p shown in FIG. 2 will be described with reference to FIG. 3. In the following description, there is used an example shown in FIG. 4, in which an image region 100 serving as one frame of a monitor includes three rectangular moving image regions, 110 to 112.

In the image region 100, pixels are arranged in a row direction α and in a column direction β.

Figure 3:
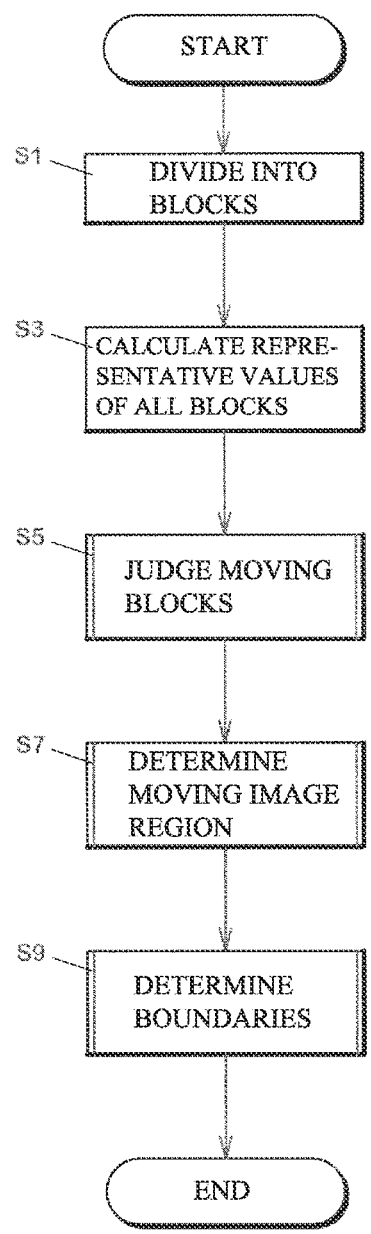
FIG. 3 is an overall flowchart.
Figure 4:
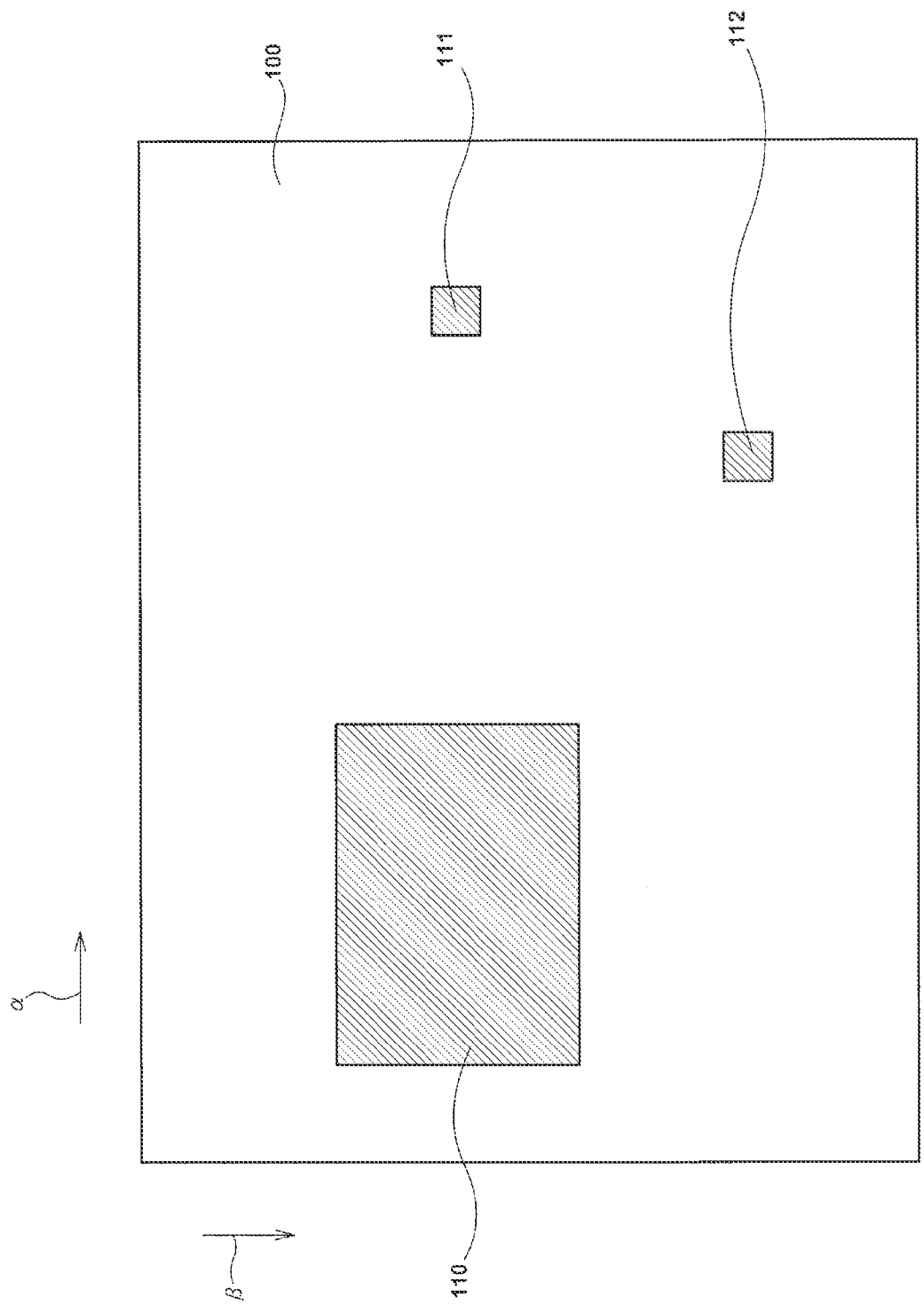
FIG. 4 shows a display region 100 including moving image regions 110 to 112.

The CPU 23 divides the display region into blocks (step S1 in FIG. 3). In the present embodiment, the display region 100 shown in FIG. 4 is divided into multiple blocks each including 32*32 pixels arranged. Hereafter, it is assumed that the display region 100 is divided into n+1 blocks in the direction α and m+1 blocks in the direction β.

The CPU 23 determines the representative values of all the blocks (step S3 in FIG. 3). Examples of the representative value include the average of the pixel values in one block and the value of the first pixel in one block. Instead of using the pixel value as it is, a hash value, such as CRC, may be used as the representative value. While the average value can be represented with an 18-bit length in a 32*32*8-bit image, the centered 8 bits obtained by discarding the upper and lower 10 bits may be used as the average value. Thus, the representative values of the (n+1)*(m+1) blocks are stored in the RAM 25.

The CPU 23 judges whether each of the (n+1)*(m+1) blocks is a moving block (step S5). The moving block judgment process will be described with reference to FIG. 5.

Figure 5:
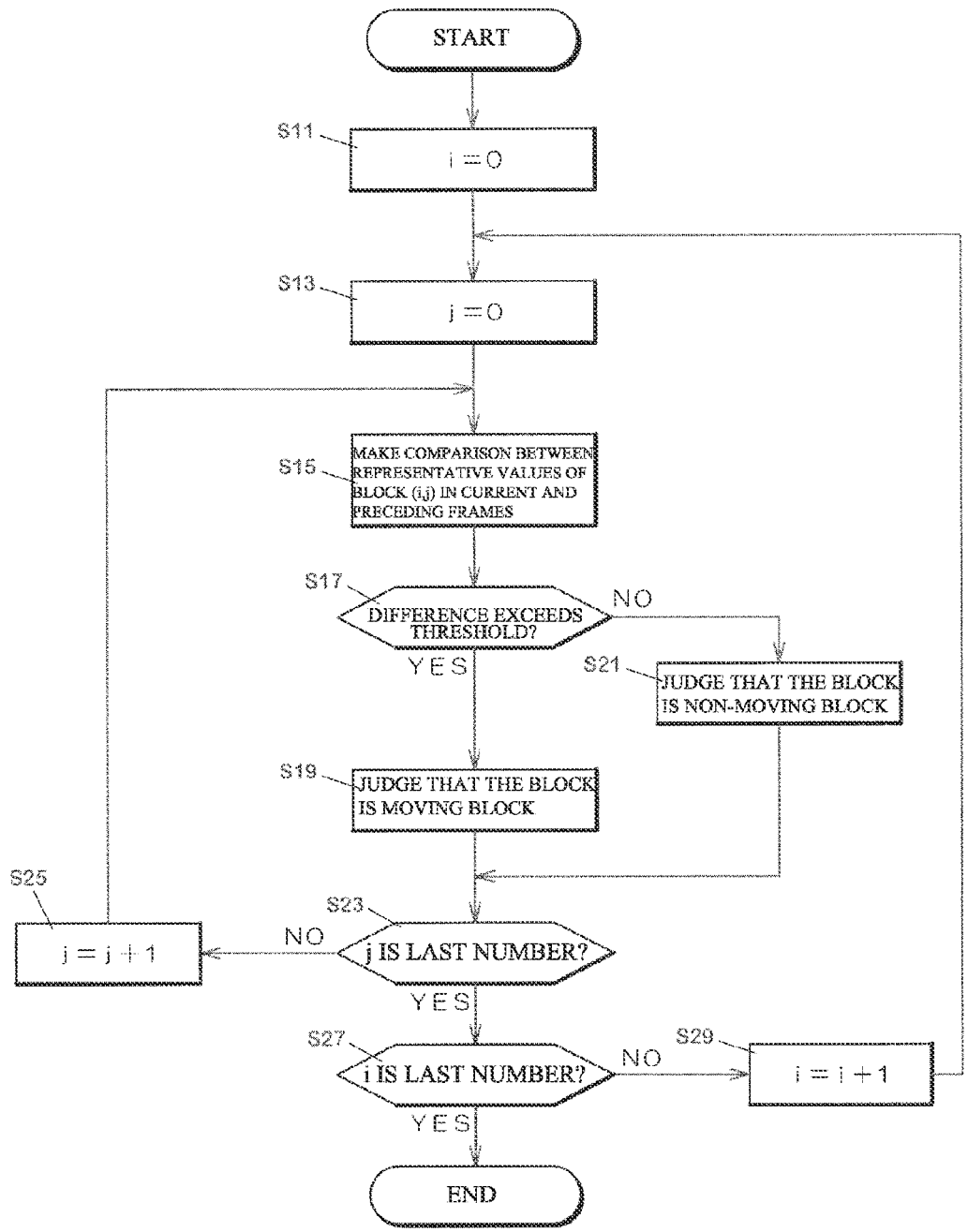
FIG. 5 is a flowchart showing a moving block judgment process.

The CPU 23 initializes process block numbers i, j (steps S11, S13 in FIG. 5). A comparison is made between the representative values of block (0,0) in the current and preceding frames (step S15). In the present embodiment, a comparison is made between the representative values of times t and t−1. The CPU 23 judges whether the difference between the representative values exceeds a threshold thb (step S17). If the difference exceeds the threshold thb, it judges that the block is a moving block (step S19). In contrast, if the difference does not exceed the threshold thb, the CPU 23 judges that the block is a non-moving block (step S21).

The CPU 23 judges whether process block number j is the last number (step S23). Since j is 0 and therefore is not the last number, the CPU 23 increments process block number j (step S25) and repeats steps S15 and later. If process block number j is the last number in step S23, the CPU 23 proceeds to step S27 and judges whether process block number i is the last number. Since i is not the last number, the CPU 23 increments process block number i (step S29) and repeats steps S13 and later. If process block number i is the last number in step S27, the CPU 23 ends the moving block judgment process.

Figure 6:
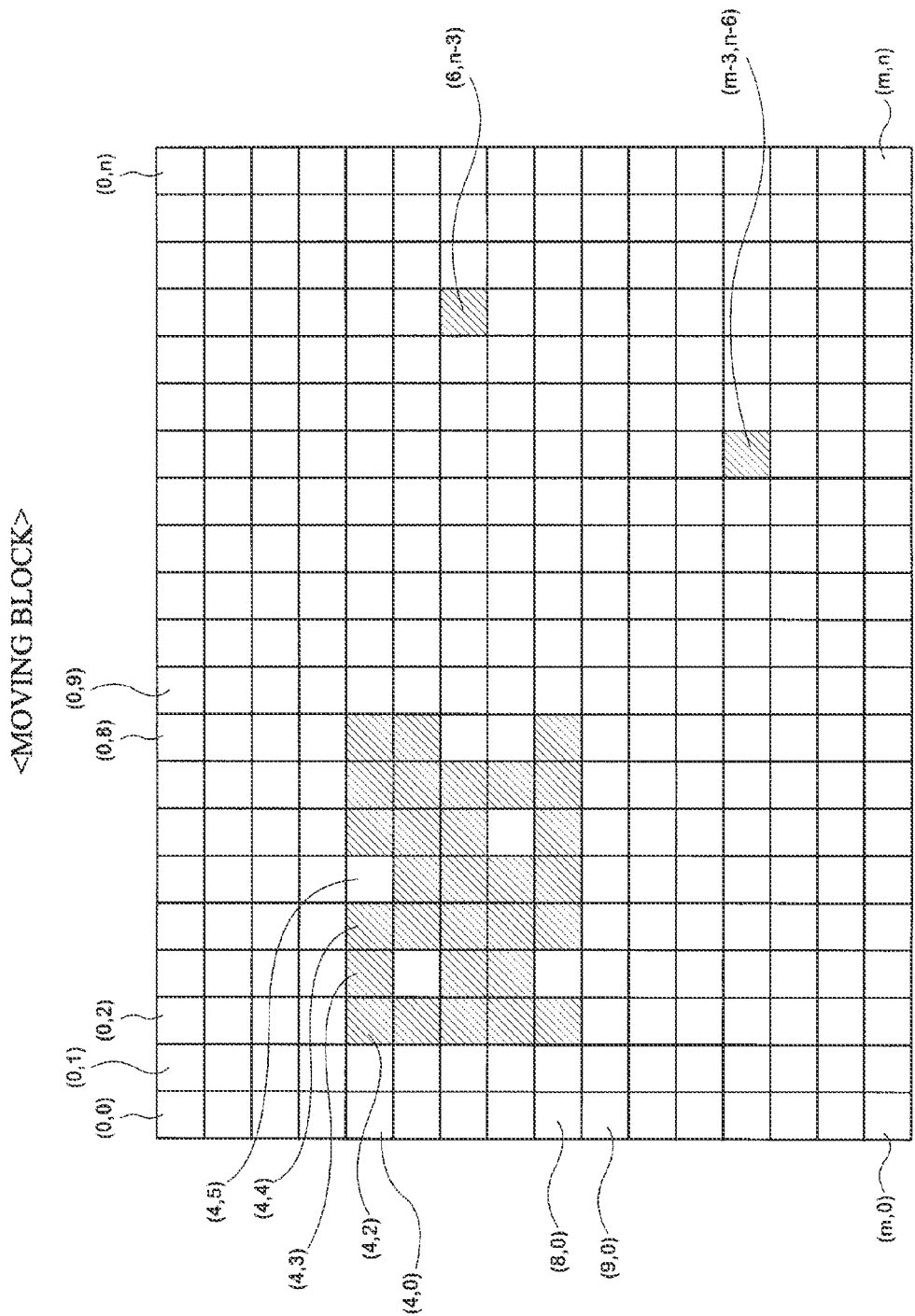
FIG. 6 is a diagram showing a detection result of moving blocks.

In this way, whether each of the (n+1)*(m+1) blocks is a moving block is judged. In this example, as shown in FIG. 6, the blocks (4,2), (4,3), (4,4), and the like are judged to be moving blocks.

The CPU 23 then performs a moving image region determination process (step S7 in FIG. 3). Details of the moving image region determination process will be described with reference to FIGS. 7 and 9.

Figure 7:
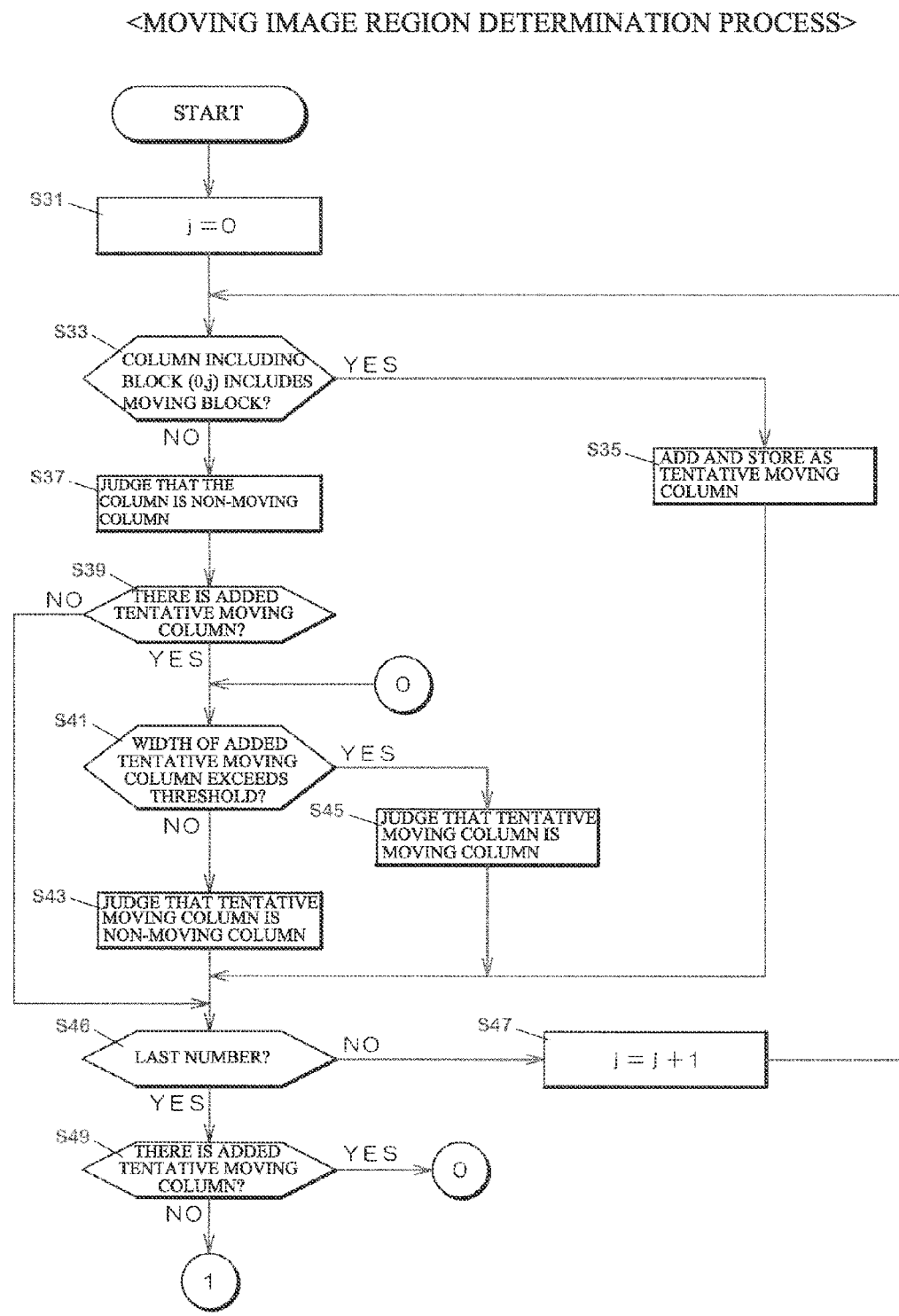
FIG. 7 is a flowchart showing a moving image region determination process.

The CPU 23 initializes process block number j (step S31 in FIG. 7). The CPU 23 then judges whether the column block including block (0,0) includes at least one moving block (step S33). Since there is no moving block among block (0,0) and blocks (1,0) to (m,0) vertically arranged from block (0,0), as shown in FIG. 6, the CPU 23 judges that this column is a non-moving column (step S37). The CPU 23 then judges whether there is an added and stored tentative moving column (step S39). Since there is no such column, the CPU 23 proceeds to step S46 and judges whether process block number j is the last number. Since j is 0 and therefore is not the last number, the CPU 23 increments process block number j (step S47) and repeats steps S33 and later.

When process block number j=2, there are moving blocks among block (0,2) and blocks vertically arranged from block (0,2). Accordingly, the CPU 23 adds and stores this column as a tentative moving column (step S35).

The CPU 23 then judges whether process block number j is the last number (step S46). Since j is 2 and therefore is not the last number, the CPU 23 increments process block number j (step S47) and repeats steps S33 and later.

Until process block number j becomes 8, the CPU 23 repeats step S35. When process block number j=9, there is no moving block in the column including block (0,9). Accordingly, the CPU 23 judges that this column is a non-moving column (step S37). The CPU 23 then judges whether there are added and stored tentative moving columns (step S39). If such columns exist, it judges whether the set of adjacent columns has a width exceeding a threshold thw (step S41). In the present embodiment, it is assumed that the threshold thw is two blocks or more. Since blocks (0,2) to (0,8) are added and stored tentative moving columns and exceed the threshold thw, the CPU 23 judges that the tentative moving columns are moving columns (step S45).

The CPU 23 then judges whether process block number j is the last number (step S46).

When process block number j=10, the column of block (0,10) includes no moving block. Accordingly, the CPU 23 judges that this column is a non-moving column (step S37). The CPU 23 then judges whether there is a detected tentative moving column (step S39). Since there is no such column, the CPU 23 judges whether process block number j is the last number (step S46).

Subsequently, until j becomes n−7, the CPU 23 judges that the column is a non-moving column. When process block number j=n−6, a moving block (m−3,n−6) exists. Accordingly, the CPU 23 adds and stores this column as a tentative moving column (step S35).

When process block number j=n−5, the column including block (0,n−5) includes no moving block. Accordingly, the CPU 23 judges that this column is a non-moving column (step S37). The CPU 23 then judges whether there are detected tentative moving columns (step S39). If such columns exist, it judges whether the set of adjacent columns has a width exceeding the threshold thw (step S41). Since it is assumed in the present embodiment that the threshold thw is two blocks or more, the width of the tentative moving column does not exceed the threshold thw. Accordingly, the CPU 23 judges whether the tentative moving column is a non-moving column (step S43). Thus, it is possible to prevent an image region, such as a mouse cursor, from erroneously being recognized as a moving image region.

Similarly, the CPU 23 sequentially judges whether each column in the row direction α includes a moving block.

Note that the last column, the column including block (0,n), may be a tentative moving column. In this case, the CPU 23 judges in step S49 whether there are added and stored tentative moving columns. If such columns exist, it performs steps S41 and later.

Figure 8:
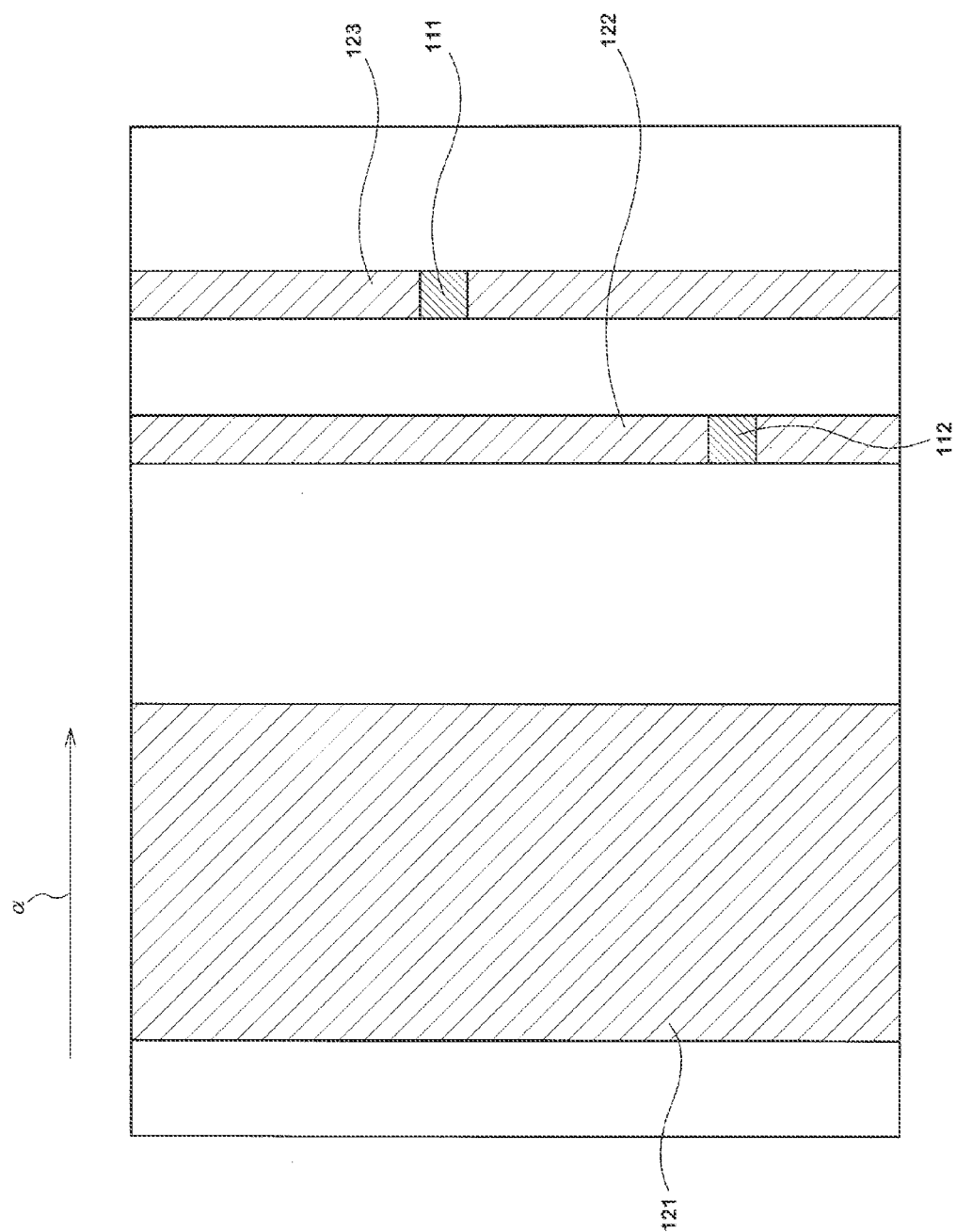
FIG. 8 is a diagram showing moving column blocks.

FIG. 8 shows detected moving columns. In this case, a region 121 is determined as a moving column. On the other hand, none of regions 122 and 123 including block (m−3,n−6) and block (6,n−3), respectively, has a width exceeding the threshold thw in the direction of arrow α. Accordingly, these regions are not determined as moving columns.

Figure 9:
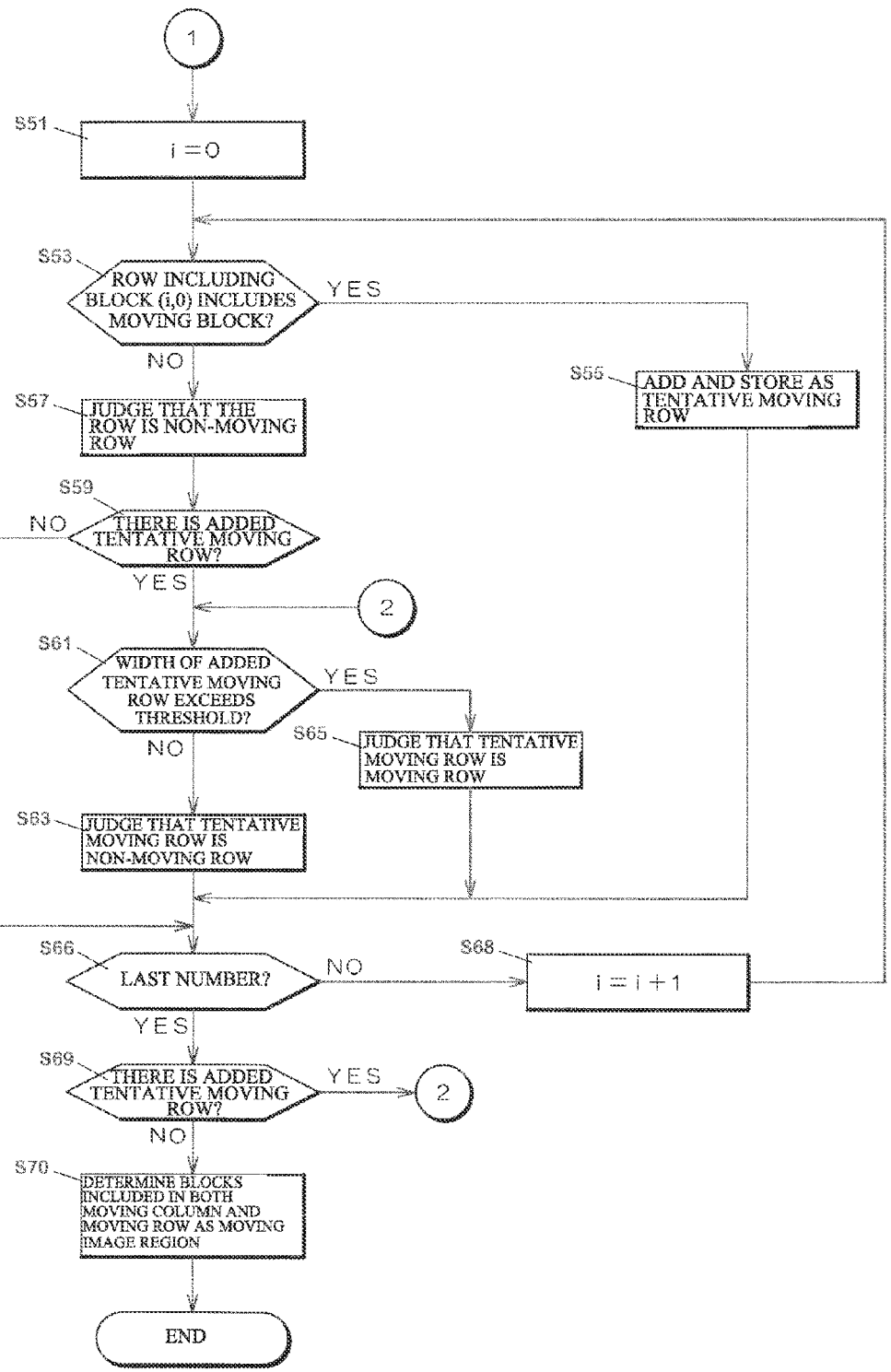
FIG. 9 is a flowchart (continued) showing the moving image region determination process.

The CPU 23 then initializes process block number i (step S51 in FIG. 9). It then judges whether the row including block (0,0) includes at least one moving block (step S53). Since block (0,0) and blocks (0,1) to (0,n) horizontally arranged from block (0,0) include no moving block, as shown in FIG. 6, the CPU 23 judges that this row is a non-moving row (step S57). The CPU 23 then judges whether there are added and stored moving rows (step S59). Since there is no detected moving row, the CPU 23 proceeds to step S66 and judges whether process block number i is the last number. Since i is 0 and therefore is not the last number, the CPU 23 increments process block number i (step S68) and repeats steps S53 and later.

When process block number i=4, the row including block (4,0) includes moving blocks. Accordingly, the CPU 23 adds and stores this row as a tentative moving row (step S55).

Similarly, until i becomes 8, the CPU 23 judges whether the row including block (i,0) is a moving row, which includes moving blocks. When i=9, the row including block (i,0) includes no moving block. Accordingly, the CPU 23 judges that this row is a non-moving row (step S57). The CPU 23 then judges whether there are added and stored moving rows (step S59). Since added and stored moving rows exist, the CPU 23 judges whether the set of added and stored moving rows has a width exceeding the threshold thw (step S61). In the present embodiment, it is assumed that the threshold thw is two blocks or more. Since blocks (4,0) to (8,0) are detected moving rows and have a width exceeding the threshold thw, the CPU 23 judges that the tentative moving rows are moving rows (step S65).

Similarly, the CPU 23 sequentially judges whether each row in the column direction β is a moving block. Step S69 is similar to step S49 and therefore will not be described.

Figure 10:
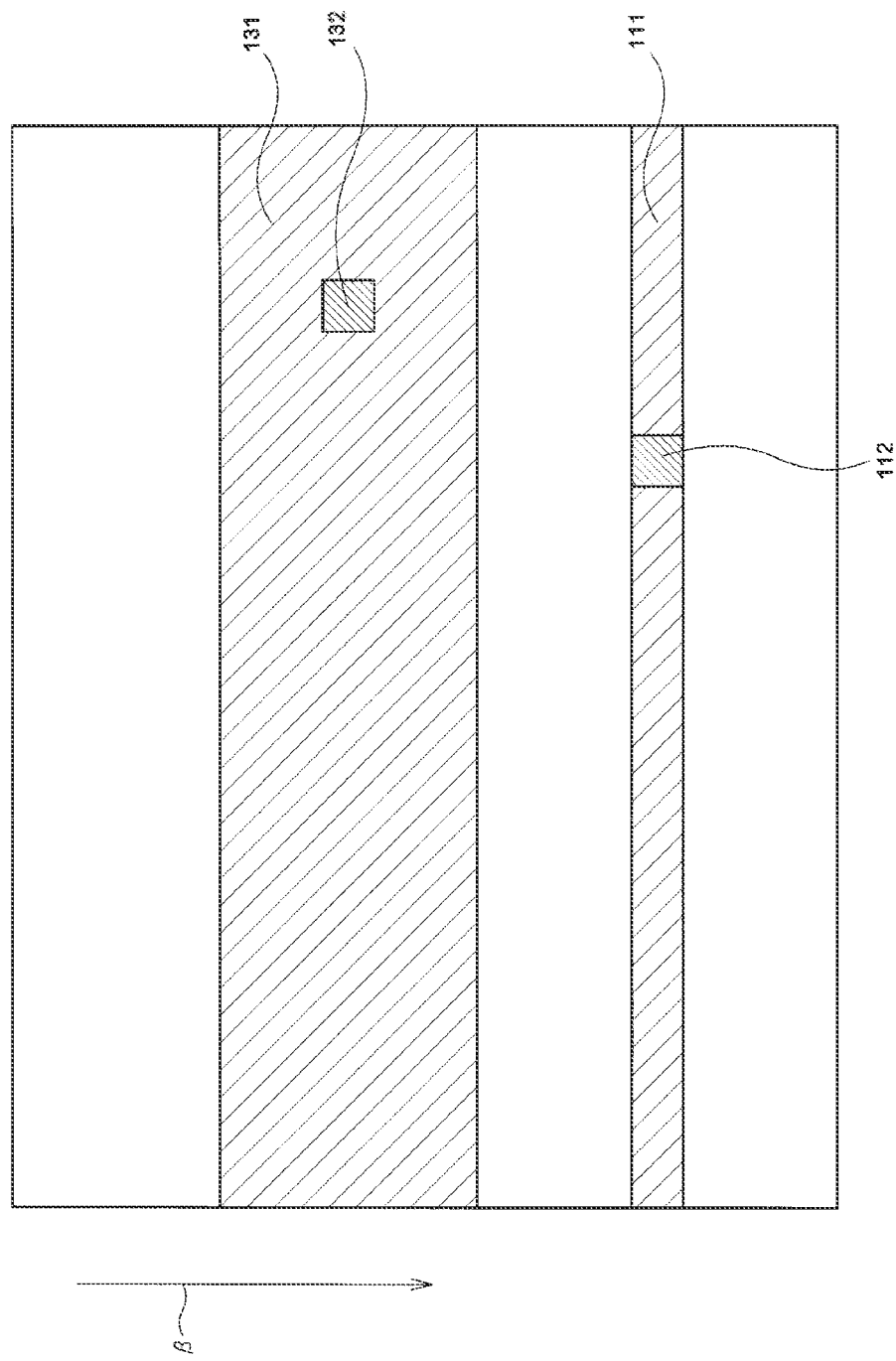
FIG. 10 is a diagram showing moving row blocks.

FIG. 10 shows a detected moving row. Specifically, a region 131 is determined as a moving row. Moving block (6,n−3) is included in the region 131. On the other hand, a region 132 including moving block (m−3,n−6) does not have a width exceeding the threshold thw in the direction of arrow β and therefore is not determined as a moving row.

The CPU 23 then determines the blocks included in both the moving column and the moving row as a moving image region (step S70 in FIG. 9). Specifically, the blocks included in a region 140 where the regions 121 and 131 shown in FIG. 11 overlap each other are determined as a moving image region. Compared to the moving blocks in FIG. 6, moving blocks (6,n−3) and (m−3,n−6) are excluded, while block (4,5) and the like are determined as a moving image region. Thus, a failure to include blocks can be prevented in relation to adjacent blocks.

The CPU 23 then performs a boundary determination process (step S9 in FIG. 3). In the region 140 shown in FIG. 11, blocks each including 32*32 pixels serve as the boundaries of the moving image region. By performing step S9, a single pixel-based boundary 150 of the moving image region as shown in FIG. 13 can be obtained. Details of step S9 will be described with reference to FIG. 12. Details of step S9 will be described with reference to FIG. 12.

Figure 12:
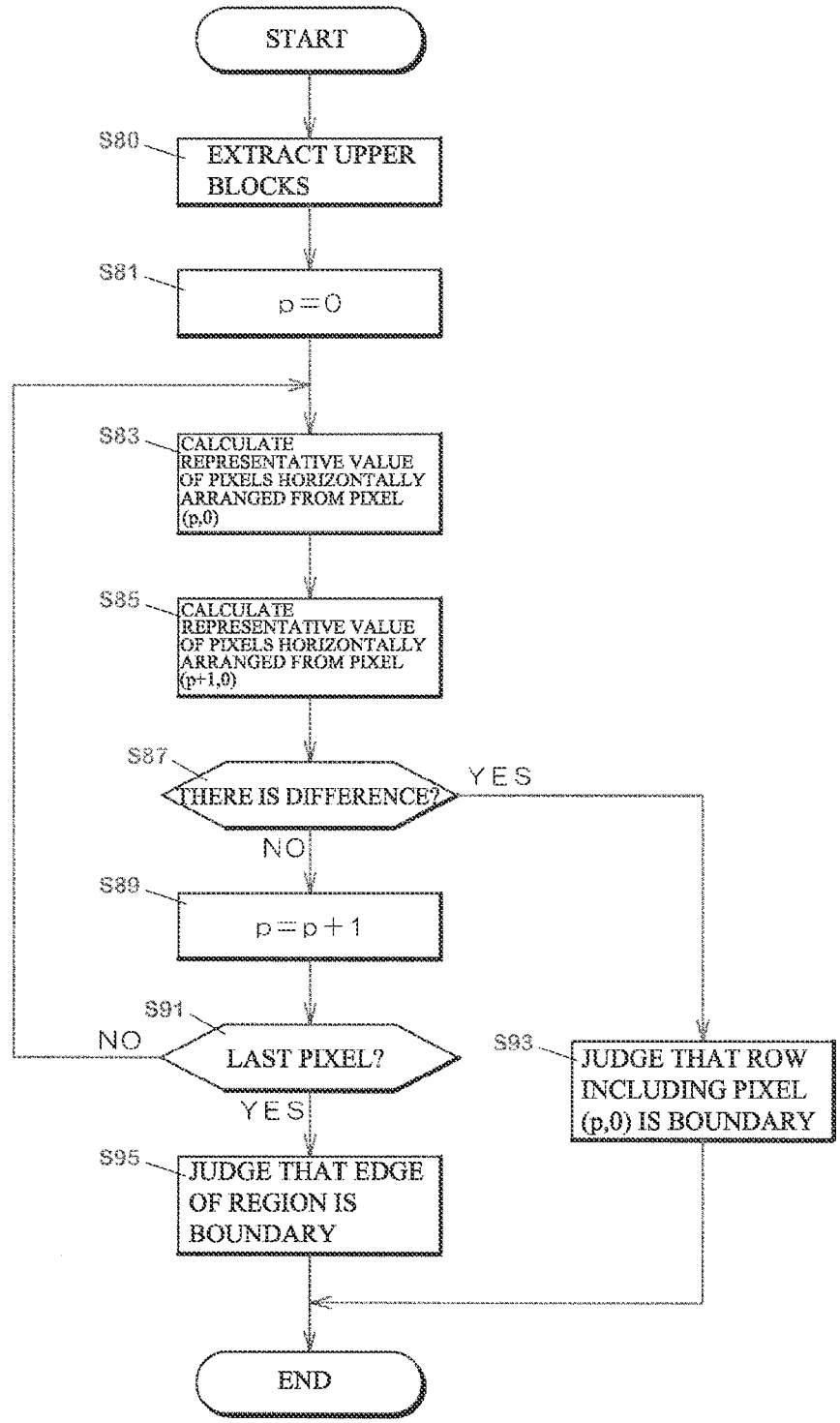
FIG. 12 is a flowchart showing a boundary determination process.
Figure 13:
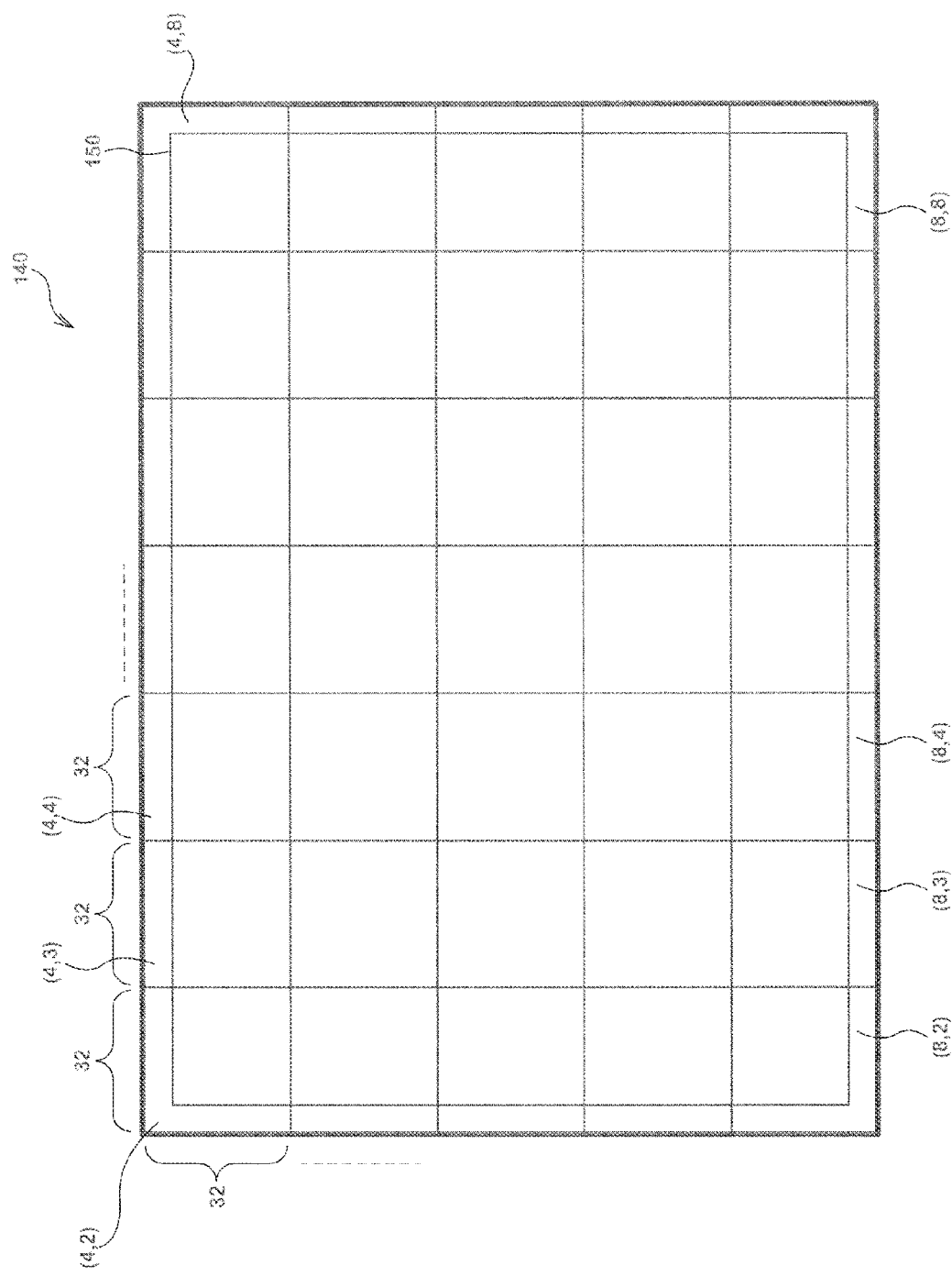
FIG. 13 is a diagram showing 32*32 pixels in one unit block.

The CPU 23 then extracts upper blocks (step S80 in FIG. 12). Specifically, it extracts a total of seven blocks, blocks (4,2) to (4,8), shown in FIG. 13. The CPU 23 then initializes process row number P (step S81) and extracts all pixels in the P'th rows of the extracted blocks and calculates the representative value thereof (step S83). Specifically, the CPU 23 extracts 32 pixels in the 0'th row of block (4,2), 32 pixels in the 0'th row of block (4,3), and the like, that is, 7*32 pixels and calculates the representative values of the row. In the present embodiment, the average of the extracted pixels is used as the representative value.

The CPU 23 then extracts all pixels in process row number P+1'th row of the extracted blocks and calculates the representative value of the row (step S85). Specifically, the CPU 23 extracts 32 pixels in the 1'st row of block (4,2), 32 pixels in the 1'st row of block (4,3), and the like, that is, 7*32 pixels and calculates the representative value of the row.

The CPU 23 then judges whether there is a difference between the representative value calculated in step S83 and the representative value calculated in step S85 (step S87). If there is a difference between both in step S87, the CPU 23 judges that the row including pixel (P,0) serves as a boundary (step S93). If there is no difference between both in step S87, the CPU 23 increments process row number P (step S89) and repeats step S83 and later until reaching the last pixels (in this case, 32 pixels) in the extracted blocks (step S91). If there is no difference between the representative value of the second last pixels and the representative value of the last pixels in step S87, the CPU 23 judges that the ends of the extracted blocks form a boundary (step S95).

While the case where the single pixel-based boundary is extracted from the upper blocks has been described in FIG. 12, the same applies to the lower blocks.

As seen above, by horizontally extracting the pixels in each row of the peripheral upper or lower blocks and making a comparison between the representative values of each row and an adjacent row, it is possible to obtain a single pixel-based boundary in the blocks.

For the left or right boundary, it is only necessary to vertically extract the pixels in each column and to make a comparison between the representative values of each column and an adjacent column.

The present apparatus can automatically detect a moving image region. Further, this detection can be performed in as few as several frames. Thus, even when a moving image region itself dynamically moves on the monitor, the present apparatus can detect the moving image region almost in real time.

2. Second Embodiment

Figure 14:
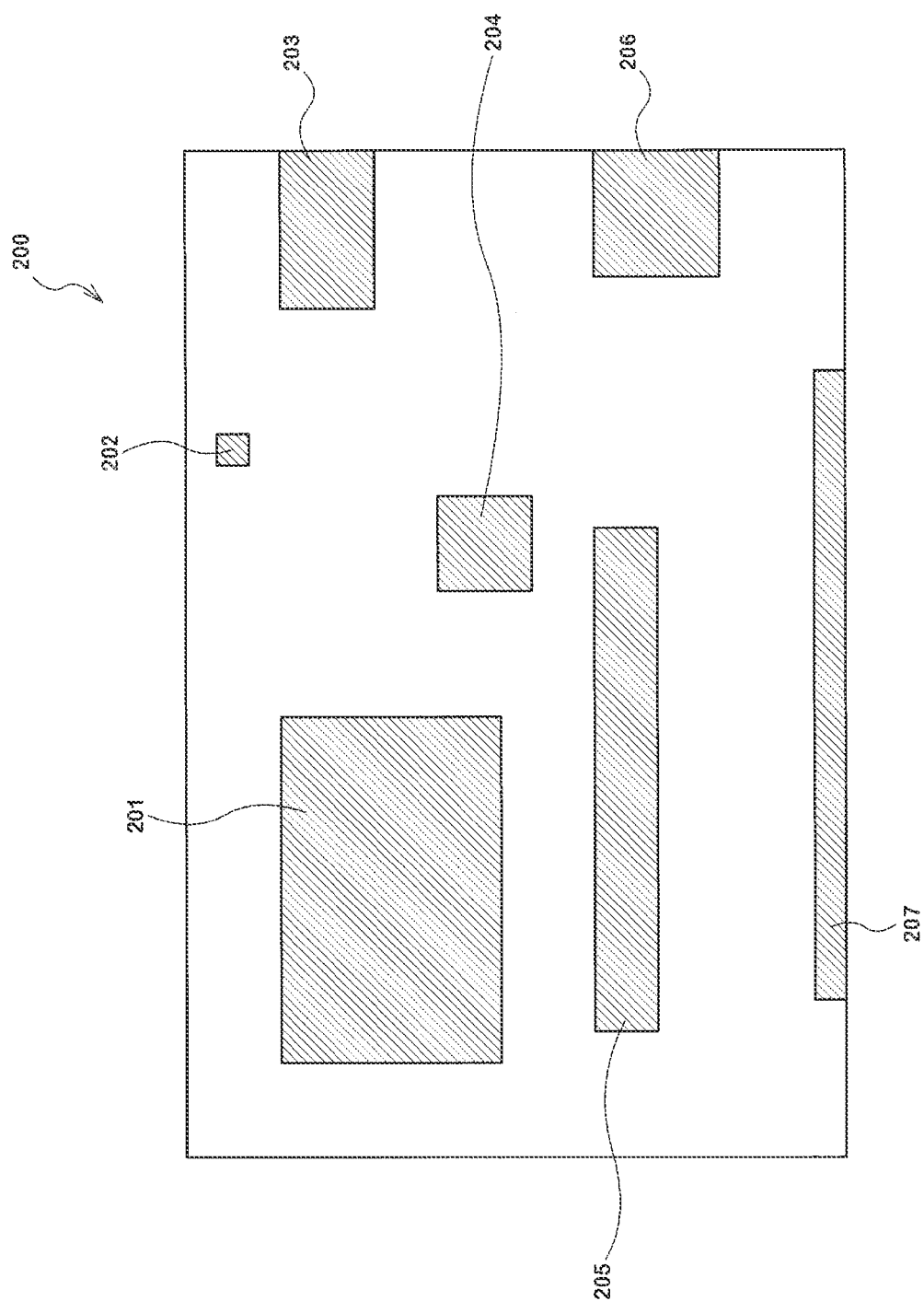
FIG. 14 shows a display region 200 including many moving image regions.

In the above embodiment, there has been described the example in which the number of regions to be detected is one. In a second embodiment, step S7 in FIG. 3, that is, the moving image region determination process is repeated. Thus, even multiple moving image regions, 201 to 207, as shown in FIG. 14, can be detected.

Figure 15:
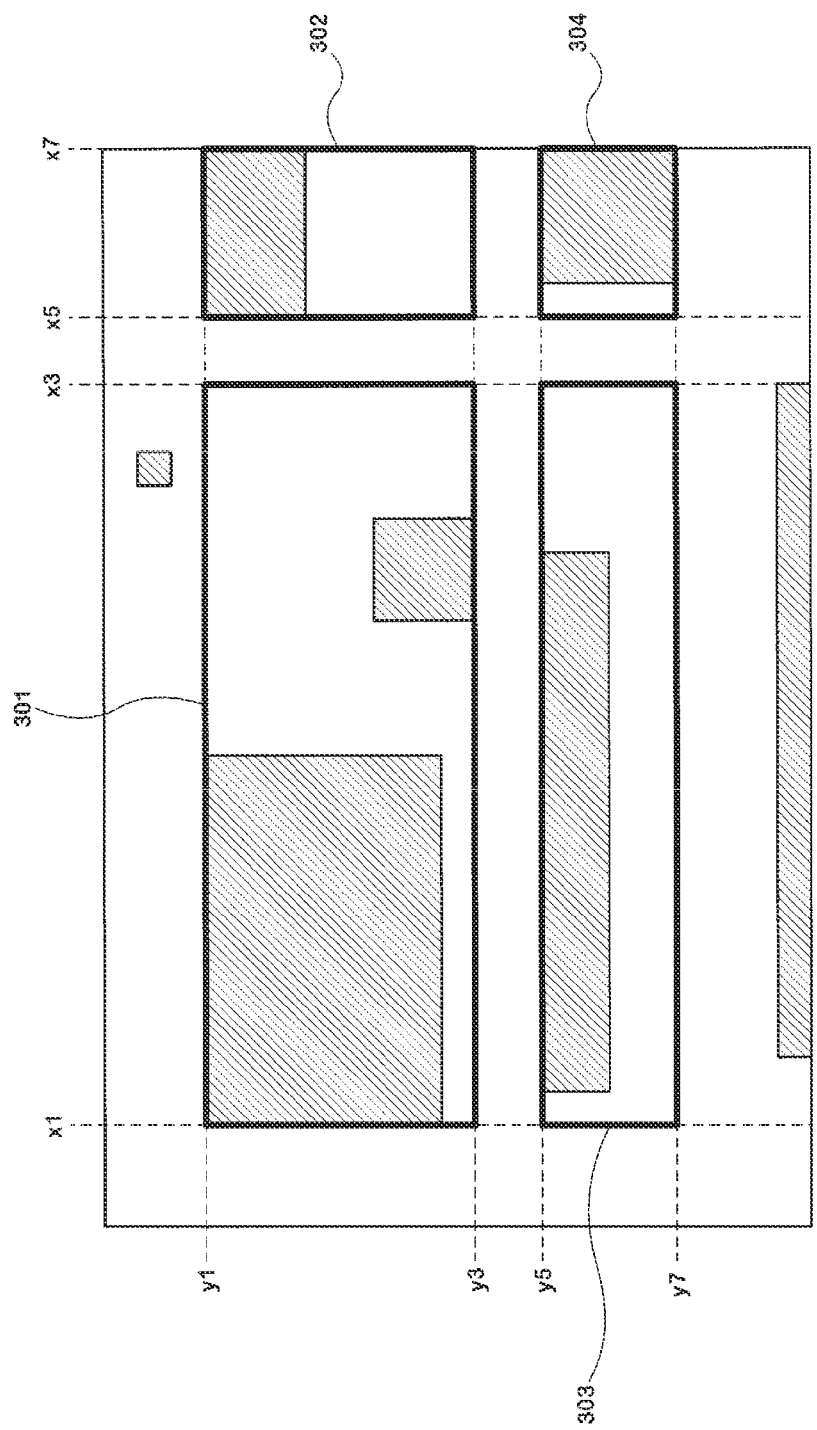
FIG. 15 shows detected moving image regions 301 to 304.

Once step S7 in FIG. 3 is performed, moving image regions 301 to 304 as shown in FIG. 15 are determined. The region 207 is determined as not having a width exceeding the threshold thw and therefore is not detected as a moving image region.

Figure 16:
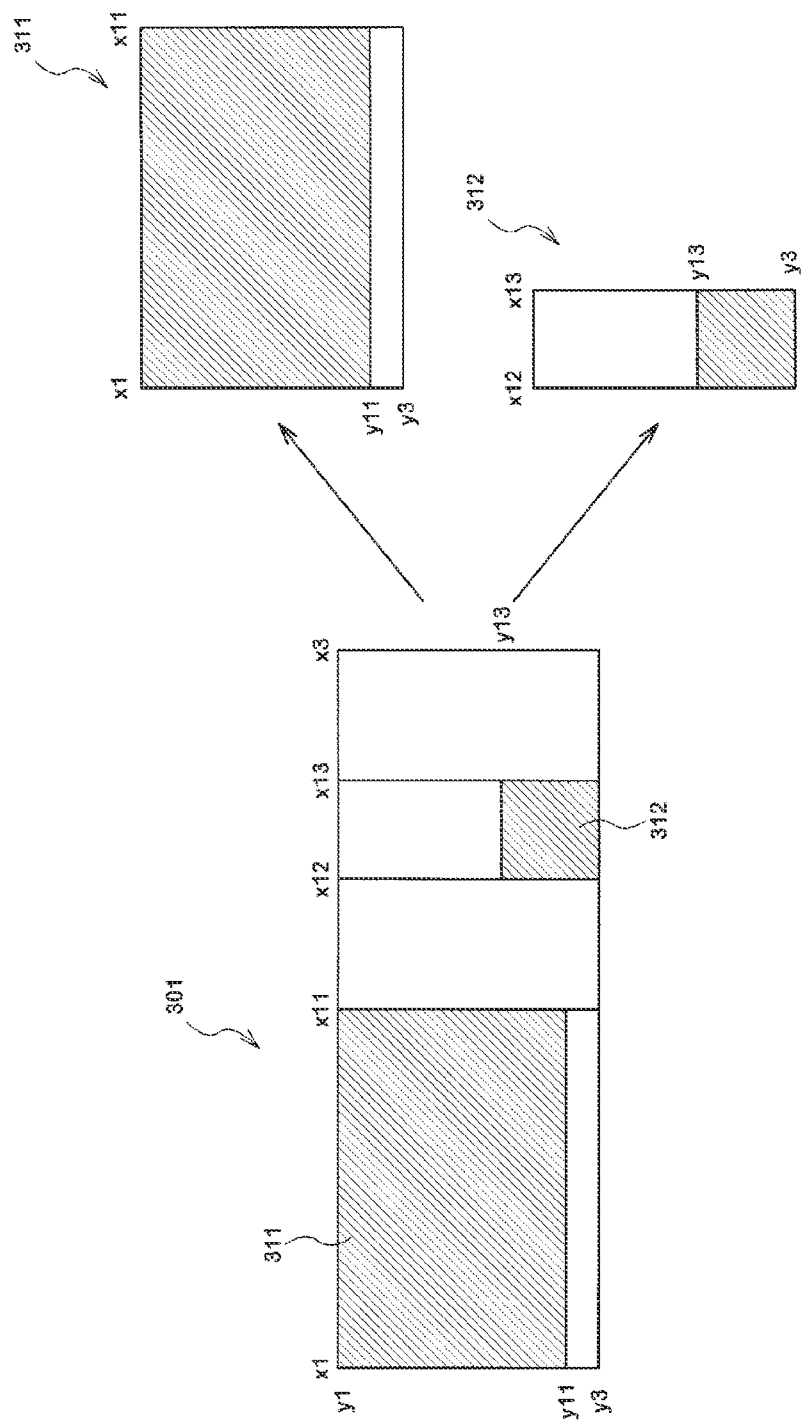
FIG. 16 shows moving image regions 311 and 312 detected from the moving image region 301.

In this state, the moving image region 301 includes non-moving image regions. Accordingly, the CPU 23 regards each of the regions 301 to 304 as a collective image region and detects moving image regions again. Thus, in the region 301, for example, a region 311 defined by block coordinates (y1, x1) and (y3,x11) and a region 312 defined by block coordinates (y1,x12) and (y3,x13) are detected (FIG. 16). The same goes for the other regions, 302 to 304.

Similarly, the CPU 23 regards the region 311 as a collective image region and detects moving image regions again. Thus, a region defined by block coordinates (y1,x1) and (y11,x11) is detected. The same goes for the region 312.

Such repeated detection may be performed until further division becomes impossible, or the upper limit frequency of repeated detection may be determined in advance.

3. Third Embodiment

In the first and second embodiments, blocks are detected; the representative values of the rows in the row direction of the unit blocks forming the peripheral four sides of the detected blocks are obtained; and if there is a difference between the representative values of one row and an adjacent row, the row is judged to be a boundary. The same goes for the columns. Alternatively, a boundary may be detected as follows. The alternative boundary detection method will be described with reference to FIG. 17.

Figure 17:
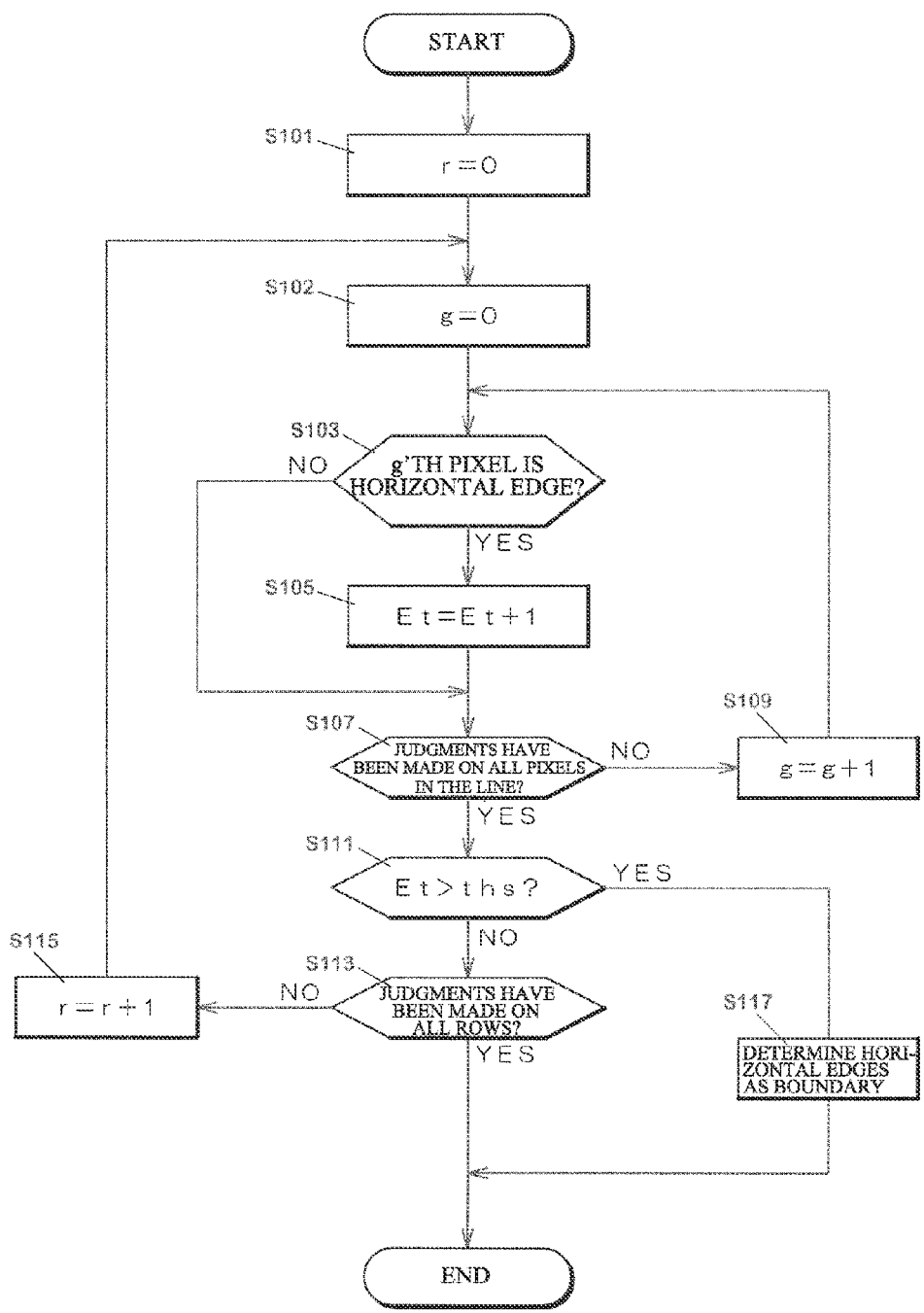
FIG. 17 is a flowchart showing a boundary determination process.

The CPU 23 extracts blocks other than blocks serving as ends from the upper blocks (step S100 in FIG. 17). Specifically, the CPU 23 extracts a total of five blocks, (4,3) to (4,7), shown in FIG. 13. The reason why the ends are excluded as described above is that parts of the blocks serving as both ends may not have an edge. Note that the edge blocks may also be used.

The CPU 23 initializes process row number r and process pixel number g (steps S101, S102 in FIG. 17) and judges whether the g'th pixel of the extracted block of row number "0" is a horizontal-edge pixel (row-direction edge) (step S103). Whether the g'th pixel is a horizontal-edge pixel may be judged based on the difference in luminance between the g'th pixel and an adjacent pixel. In the present embodiment, a filter and formula as shown in FIG. 18A are employed.

If the CPU 23 judges that the g'th pixel is a horizontal-edge pixel, it increments a total number Et (step S105 in FIG. 17). The CPU 23 then judges whether all pixels in this line have been subjected to the determination process (step S107). If not, the CPU 23 increments process pixel number g (step S109) and repeats steps S103 to S107.

After the CPU 23 judges whether each of all pixels in this line is a horizontal edge, it judges whether the total number Et of the horizontal edges in this line exceeds a predetermined threshold ths (step S111). This is done to exclude horizontal-edge pixels serving as parts of an outline in the moving image region. If the total number Et of the horizontal edges exceeds the threshold ths, the CPU 23 judges that the horizontal edges form a boundary (step S117). In this way, the boundary in which the set of horizontal edges exceeds the threshold ths can be obtained.

The threshold ths may be a fixed threshold or may be calculated according to a predetermined ratio and the size (the number of blocks) of the detected region.

If "NO" in step S111, the CPU 23 judges whether all rows have been subjected to the determination process (step S113). If all the rows have not been subjected, the CPU 23 increments process row number r and repeats steps S102 to S111.

In this way, a single pixel-based boundary can be determined. The same applies to a single pixel-based boundary in the lower blocks.

Similarly, the left or right boundary is determined by detecting vertical edges (column-direction edges) in the leftmost or rightmost unit blocks using a filter and formula shown in FIG. 18B.

In the present embodiment, a boundary is determined based on the total number of the vertical edges or horizontal edges. Thus, it is possible to detect even a moving image region on a confusing background. Further, detection accuracy is increased, and jitter of the moving image region is reduced.

Figure 11:
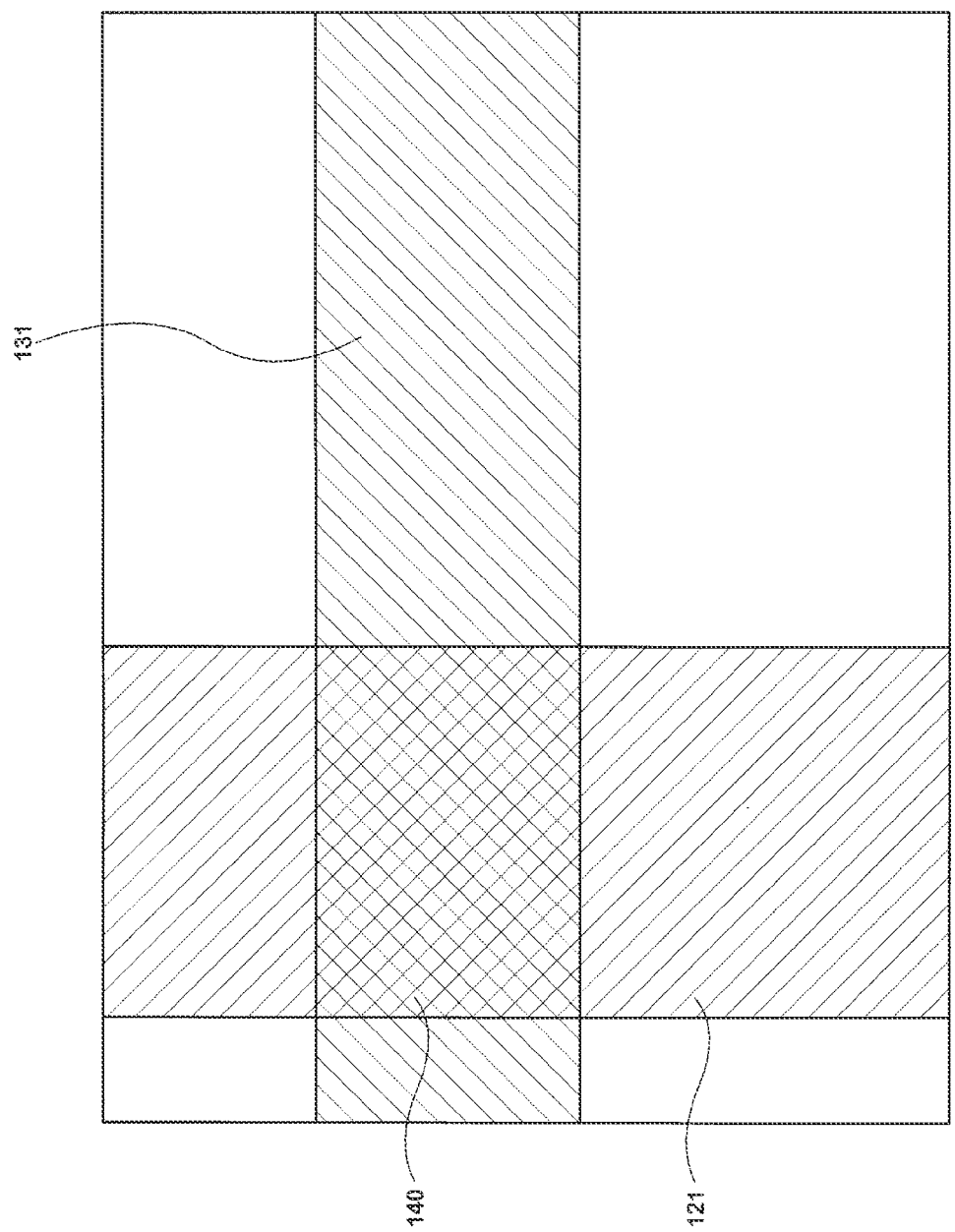
FIG. 11 is a diagram showing a moving image region 140.

In the present embodiment, the pixels in all the blocks other than the blocks serving as ends, of the blocks obtained in FIG. 11 are used to obtain a boundary. Alternatively, a boundary may be obtained using some of these pixels.

In the present embodiment, the total number of the edges in one line is compared with the threshold ths. Alternatively, a predetermined number or more of continuously arranged edge pixels may be judged to form a boundary. Since a natural image includes an edge image in some cases, continuously arranged edges whose number is smaller than the predetermined number may be excluded from the calculation of the total number.

While the present embodiment is applied to the case where the rectangular region is determined and then the single pixel-based boundaries are obtained in the blocks forming the peripheries of the rectangular region, the present embodiment is also applicable to motion estimation in general and to other fields. A multiple pixel-based (e.g., 2*2 pixel-based) boundary may be obtained in place of a single pixel-based boundary.

In the present embodiment, edge pixels are extracted to determine a boundary. Alternatively, by judging whether each of the pixels in the target blocks is a pixel having a motion vector between different frames, the boundary between pixels in which a motion vector can be detected and pixels in which no motion vector can be detected may be judged to be a boundary.

Figure 19:
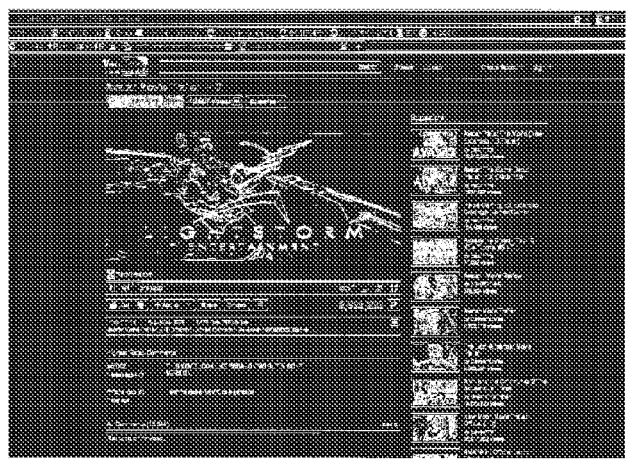
FIGS. 19A to 19C show an example moving image to describe a boundary judgment using histories in the time-axis direction.
Figure 19:
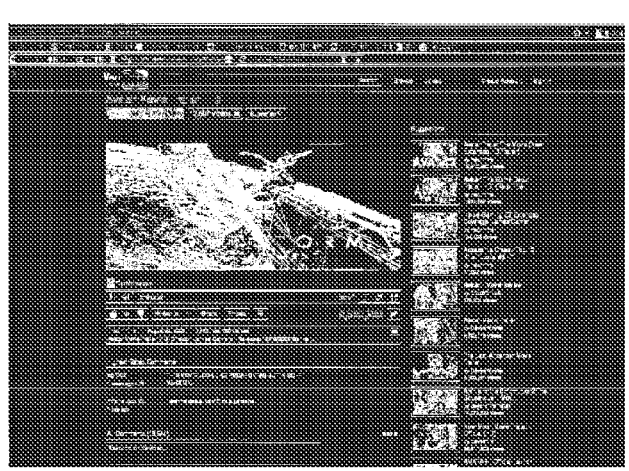
Figure 19:
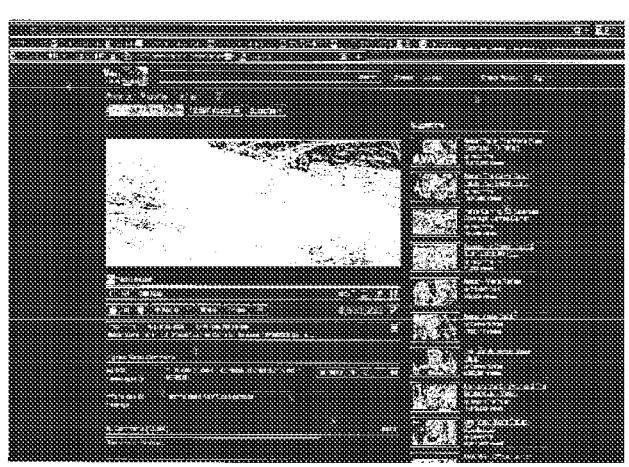

Note that in a particular frame, there may be little difference in luminance between the moving image region and the background. For example, in a frame t shown in FIG. 19A, there is little difference in luminance between the boundaries of the background and the moving image region. It may be impossible to detect the boundaries using only this frame. For this reason, by sequentially storing the boundaries in each frame, the stored boundaries may be used when any boundary cannot be detected in one frame. In the present embodiment, a dozen or so frames are stored.

In the present embodiment, there has been described the case where the process of detecting blocks each including multiple pixels (hereafter referred to as the coarse process) is performed first. Alternatively, rectangular boundaries may be determined without this process.

The present embodiment may be applied to an apparatus for determining the rectangular boundaries of a still image rather than to multiple frames.

4. Fourth Embodiment

In the above embodiments, whether a region is a moving image region is judged based on pixel information between frames. However, when text data is being scrolled in a particular rectangular region, the text data may be erroneously judged to be a moving image region. For this reason, as described below, a scroll judgment may be performed and, if it is judged that the text data is being scrolled, a boundary determination may be cancelled.

In horizontally written text data, there is space between character lines. Specifically, horizontally written text data is characterized in that there are many edge pixels in the character-written region of each line, while there is no edge pixel between character lines. Accordingly, whether a region is a moving image region can be judged based on whether the region has such characteristics.

Figure 20:
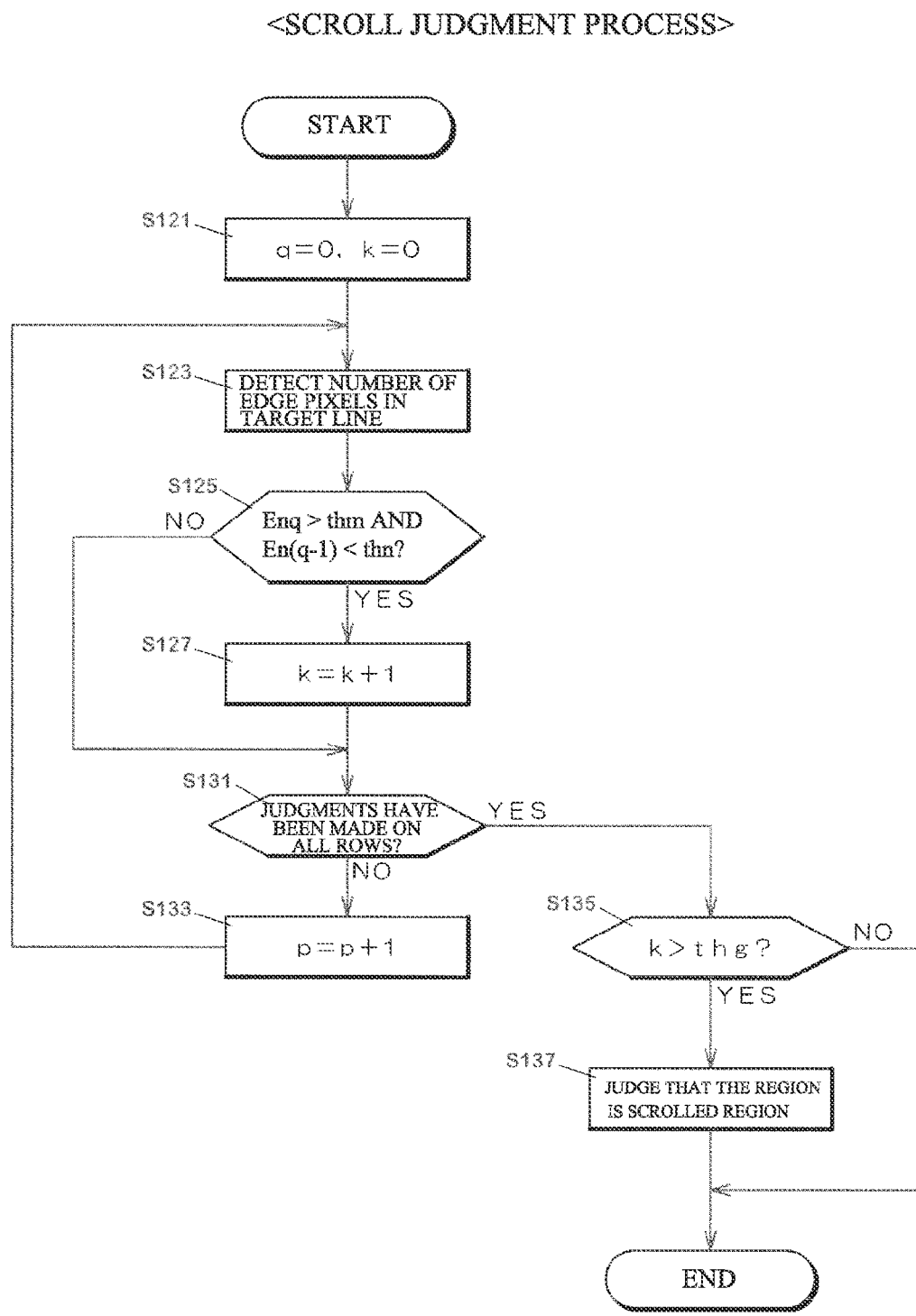
FIG. 20 is a flowchart showing a scroll judgment process.

The CPU 23 initializes target row number Q and the number of matching rows k (step S121 in FIG. 20) and calculates the total number of edge pixels Enq in the Q'th row of an extracted block (step S123). Whether a pixel is an edge pixel may be judged based on the difference in luminance between the pixel and an adjacent pixel.

The CPU 23 then judges whether the total number of edge pixels Enq exceeds a threshold thm and whether the total number of edge pixels, En(q−1), in the preceding row falls below a threshold thn (step S125). If "YES" in step S125, the CPU 23 increments the number of matching rows k (step S127).

The CPU 23 then judges whether judgments have been made on all rows (step S131). If judgments have not been made on all rows, it increments process row number Q (step S133) and repeats steps S123 to S127.

If the CPU 23 judges in step S131 that judgments have been made on all rows, it judges whether the number of matching rows k exceeds a threshold thg (step S135). If the number of matching rows k exceeds the threshold thg, the CPU 23 judges that the motion is being made by scrolling (step S137).

The scroll judgment is performed between steps S7 and S9 in FIG. 3. If the CPU 23 judges that the motion is being made by scrolling, it may cancel step S9.

Thus, when a character region is being scrolled in the browser, it is possible to prevent the region from being judged to be a moving image.

The scroll judgment may be made on some rows in the region rather than on all rows in the region.

While the case where text data is written horizontally has been described in the present embodiment, it is also possible to make the scroll judgment on vertically written text data. Note that the method for making a scroll judgment is not limited to that described above and may be well-known methods.

While the case where the present embodiment is applied to the scroll judgment in the moving image region determination process has been described, the present embodiment may be applied to scroll judgment in general.

Further, although a particular region is not being scrolled, it is possible to judge whether the particular region is a text region. In this case, the particular region is not limited to a moving image region detected in the moving image region detection process and may be a particular region in an image which may be a still image or moving image.

The present embodiment also provides a method for determining a rectangular moving image region displayed in part of a display region having pixels arranged in row and column directions therein. The method includes: a moving unit block judgment step of dividing the display region into unit blocks each including a predetermined number of pixels and judging whether each unit block is a moving unit block having a motion; a moving column block determination step of defining, as a column block, a set of unit blocks included in a column including one of uppermost unit blocks of the unit blocks and, if one column block includes at least one moving unit block, determining the column block as a moving column block; a moving row block determination step of defining, as a row block, a set of unit blocks included in a row including one of leftmost unit blocks of the unit blocks and, if one row block includes at least one moving unit block, determining the row block as a moving row block; a first rectangular moving image region determination process of determining, as a rectangular moving image region, a rectangular region specified by unit blocks included in both the moving row block and the moving column block; and a second rectangular moving image region determination step of determining a region defined by edges in the rectangular moving image region as the rectangular moving image region on the basis of pixels in unit blocks forming peripheral four sides, of the unit blocks included in the rectangular moving image region.

As seen above, a moving image region can be determined by judging whether each of the unit blocks is a moving unit block, determining the moving row block and the moving column block, and determining, as a rectangular moving image region, the rectangular region specified by unit blocks included in both the moving row block and moving column block. Further, a moving image region can be determined more precisely by determining a region defined by edges in the rectangular moving image region as the rectangular moving image region on the basis of pixels in unit blocks forming the peripheral four sides, of the unit blocks included in the region.

In the method of the present embodiment, the second rectangular moving image region determination step includes determining a row having a different representative value in the unit blocks forming the peripheral four sides as a row-direction boundary of the rectangular moving image region and determining a column having a different representative value in the unit blocks forming the peripheral four sides as a column-direction boundary of the rectangular moving image region. Thus, it is possible to determine the boundaries on the basis of the representative pixel value of each row.

In the method of the present embodiment, the second rectangular moving image region determination step includes determining boundaries of the rectangular moving image region by judging whether each pixel in the unit blocks forming the peripheral four sides is a moving pixel which moves between different frames. Thus, it is possible to determine the boundaries on the basis of the motion vector of each pixel.

In the method of the present embodiment, the second rectangular moving image region determination step includes extracting pixels forming a row-direction edge and pixels forming a column-direction edge from pixels in the unit blocks forming the peripheral four sides and determining boundaries of the rectangular moving image region on the basis of the total number of pixels forming row-direction edges in respective rows and the total number of pixels forming column-direction edges in respective columns. Thus, it is possible to determine the boundaries on the basis of the row-direction edges and column-direction edges.

In the method of the present embodiment, prior to the second rectangular moving image region determination step, a scroll judgment is made in which it is determined whether an image in the determined rectangular moving image region varies between frames due to scrolling. Thus, it is possible to judge whether the image varies due to scrolling. If it is determined that the image varies due to scrolling, the second rectangular moving image region determination step is not performed. Thus, determination of a rectangular moving image region can be made quickly as a whole.

In the method of the present embodiment, the scroll judgment includes judging whether each of pixels in the determined rectangular moving image region is an edge, based on a difference in value between the pixel and an adjacent pixel, recognizing, as a character gap region, a row or column in which a predetermined number or more of pixels not forming edges exist in a row or column direction, and making the scroll judgment on the basis of the ratio of the character gap region to the determined rectangular moving image region. Thus, it is possible to reliably judge whether an image including characters is being scrolled.

In the method of the present embodiment, prior to the second rectangular moving image region determination step, the moving column block determination step, the moving row block determination step, and the first rectangular moving image region determination step are repeatedly performed on the rectangular moving image region determined in the first rectangular moving image region determination step. Thus, even when there are multiple moving image regions to be detected, the moving image regions can be detected accurately.

In the method of the present embodiment, the first rectangular moving image region determination step includes further repeatedly performing the moving column block determination step and the moving row block determination step on the determined rectangular region. Thus, even when there are multiple moving image regions to be detected, the moving image regions can be detected accurately.

The present embodiment also provides an apparatus for judging whether a target region to be judged in a screen is a scrolled region. The apparatus includes: edge pixel judgment means configured to judge whether each pixel in the target region is an edge, based on the difference in value between the pixel and an adjacent pixel; character gap region judgment means configured to judges, as a character gap region, a row or column including a predetermined number or more of pixels not forming edges; and scroll region judgment means configured to judge whether the target region is a scrolled region, based on the ratio of the character gap region to the target region.

Thus, it is possible to reliably judge whether an image including characters is being scrolled.

The present embodiment also provides an apparatus for determining boundaries of a rectangular region in a screen. The apparatus includes: edge pixel judgment means configured to judge pixels forming edges on the basis of values of target pixels to be judged; row-direction boundary determination means configured to extract pixels forming row-direction edges as row-direction edge pixels, to calculate the total number of the row-direction edges in each row, and to determine a row-direction boundary on the basis of the total number of the row-direction edge pixels in the respective rows; column-direction boundary determination means configured to extract pixels forming column-direction edges as column-direction edge pixels, to calculate the total number of the column-direction edges in each column, and to determine a column-direction boundary on the basis of the total number of the column-direction edges in the respective columns; and rectangular region determination means configured to determine the determined row-direction and column-direction boundaries as boundaries of the rectangular region.

Thus, it is possible to determine the boundaries on the basis of the row-direction and column-direction edges.

The boundary determination apparatus of the present embodiment further includes coarse region determination means configured to determine target pixels on which the edge pixel judgment means is to make judgments and including the following means:

1) moving unit block judgment means configured to divide a display region into unit blocks each including a predetermined number of pixels, the display region having pixels arranged in row and column directions therein, and to judge whether each unit block is a moving unit block having a motion;

2) moving column block determination means configured to define, as a column block, a set of unit blocks included in a column including one of uppermost unit blocks of the unit blocks and to, if one column block includes at least one moving unit block, determine the column block as a moving column block;

3) moving row block determination means configured to define, as a row block, a set of unit blocks included in a row including one of leftmost unit blocks of the unit blocks and to, if one row block includes at least one moving unit block, determine the row block as a moving row block;

4) first rectangular moving image region determination means configured to determine, as a rectangular moving image region, a rectangular region specified by unit blocks included in both the moving row block and the moving column block; and 5) target pixel determination means configured to determine, as the target pixels, pixels included in unit blocks forming peripheral four sides, of the unit blocks included in the rectangular moving image region.

Thus, it is possible to determine the boundaries more quickly.

5. Fifth Embodiment

The above embodiments allow moving boundaries (box) having a rectangular external shape to be determined. Accordingly, when both a still image region and a moving image region are displayed, for example, when a moving image posting site is displayed on a browser, it is possible to dynamically detect the moving region to use a display method (e.g., change of the edge enhancement processing) different from that for the still image region. As a result, even when the user moves the window of the browser or changes the shape of the window, for example, by enlarging it, it is possible to cause the moving region to automatically follow the movement or the like of the window.

However, this automatic follow-up may cause, for example, problems described below.

1) Typically, when the movement is temporarily stopped by a user operation or the like, the moving region disappears; when playback is resumed, the moving region is detected again. During the temporary stop and resumed playback, the edge enhancement processing on the region is changed. This may make the user feel strange.

2) There are also moving regions whose some portions alone are moving but whose most portions do not move, as seen in lip-sync in animation. If this state continues for a predetermined period of time, the some portions alone may be judged to be a moving region and then subjected to the edge enhancement processing or the like.

According to the present embodiment, a device for dynamically detecting a rectangular moving region can properly detect a rectangular moving region even in a special situation by performing the following processes.

Figure 21:
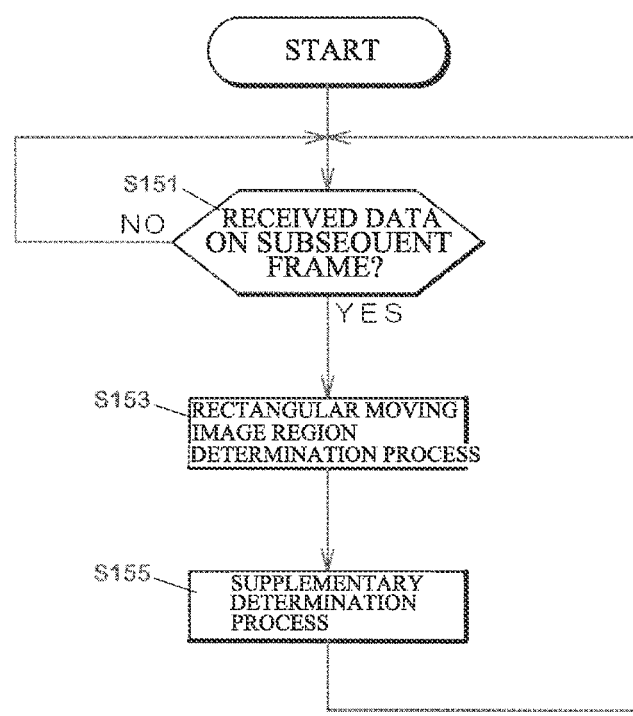
FIG. 21 is a flowchart showing the relationship between a moving region detection process and a supplementary determination process.

FIG. 21 shows the relationship between the moving region detection process of the above embodiments and a supplementary determination process of the present embodiment. As seen in FIG. 21, the supplementary determination process (step S155) is a process performed when no moving region has been detected or an improper moving region has been detected in the moving region detection process (step S153).

5.1 When Movement is Temporarily Stopped

The overall process including the supplementary determination process will be described with reference to FIGS. 21 and 22. In the following description, it is assumed that the movement is temporarily stopped at time t and then the size of the browser window is minimized and left alone at time t+5.

When the CPU 23 receives data on a subsequent frame, it performs a moving region detection process in step S153 in FIG. 21. In this process, a movement is detected between the respective frames of times t−1 and t. Since playback is temporarily stopped at time t, there is a difference between the frames and thus a moving region is detected.

The CPU 23 then proceeds to step S155 in FIG. 21. Details of step S155 is shown in FIG. 22.

Figure 22:
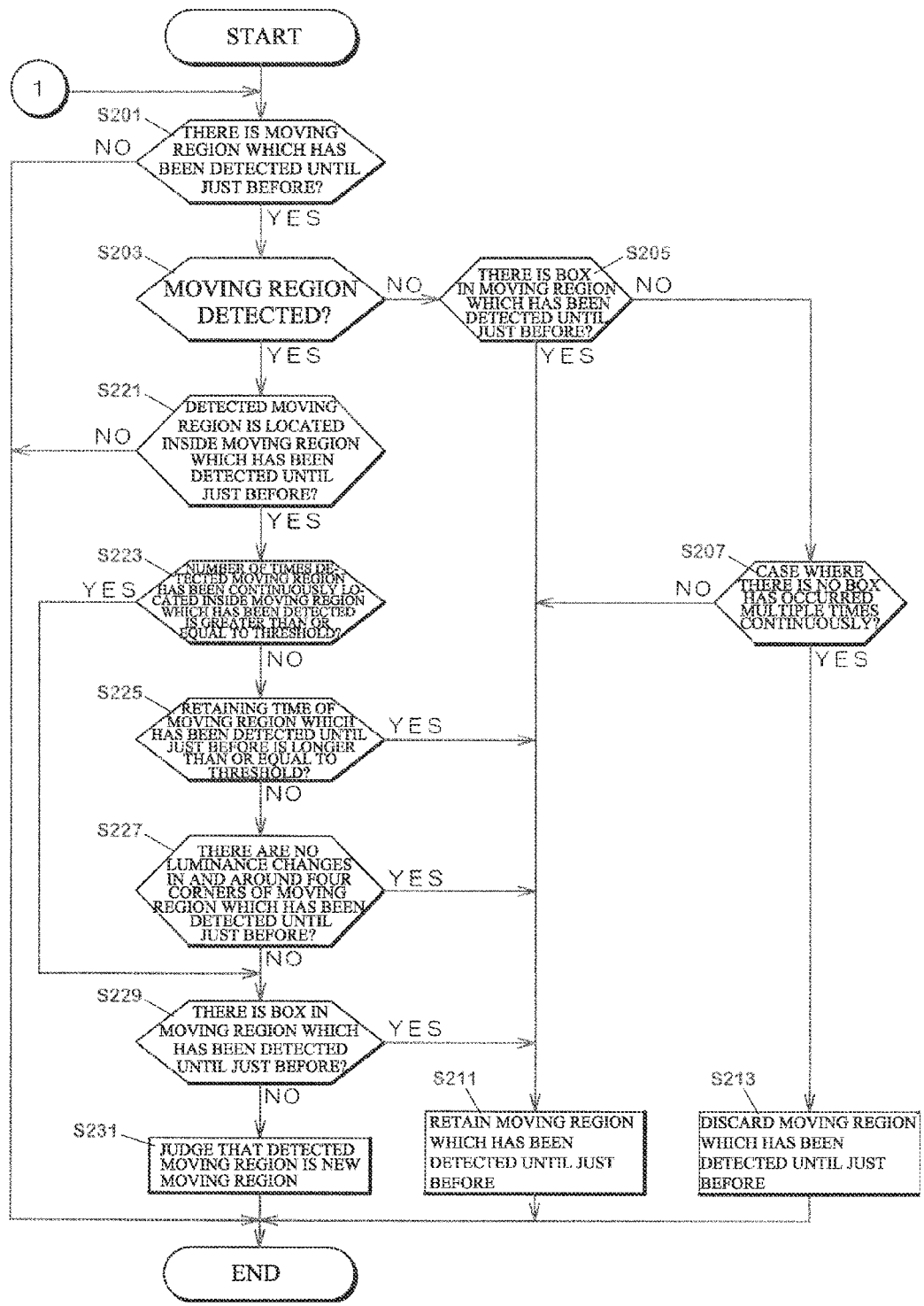
FIG. 22 is a flowchart showing the supplementary determination process.

At the present point in time, that is, at time t, the CPU 23 judges whether there is a moving region which has been detected until just before (step S201 in FIG. 22). Since there has been a moving region just before, that is, at time t−1, the CPU 23 judges whether a moving region has been detected at time t (step S203).

Since a moving region has been detected in step S153 in FIG. 21 at time t, the CPU 23 judges whether the detected moving region is located inside the moving region which has been detected until just before (step S221). In this case, the detected moving region is the same as the moving region which has been detected until just before and therefore is not located inside the latter. For this reason, the supplementary determination process is ended.

The CPU 23 then judges whether it has received data on a subsequent frame (step S151 in FIG. 21).

When the CPU 23 receives data on a subsequent frame, it performs a moving region detection process in step S153 in FIG. 21. In this process, the CPU 23 judges whether a moving region is detected at time t+1. Specifically, it judges whether a movement is detected between the respective frames of times t and t+1. Since playback has been temporarily stopped at time t, there is no difference between the frames of times t and t+1. Accordingly, no movement is detected.

The CPU 23 then performs a supplementary determination process (step S155 in FIG. 21). Specifically, at time t+1, the CPU 23 judges whether there is a moving region which has been detected until just before (step S201 in FIG. 22). Since there has been a moving region just before, that is, at time t, the CPU 23 judges at time t+1 whether a moving region has been detected (step S203).

In this case, no moving region has been detected in step S153 in FIG. 21. Accordingly, the CPU 23 judges whether there is a box in the moving region which has been detected until just before, of the frame of time t+1 (step S205 in FIG. 22). For example, the CPU 23 may judge that there is an edge between pixels when there is a predetermined or greater difference in value between the pixels and may judge that there is a box when the total number of edges exceeds the threshold. Note that other known methods may be used to judge whether there is a box.

In this case, playback is simply stopped temporarily. Accordingly, there are edges in the moving region which has been detected until just before, in the frame of time t+1. Accordingly, the CPU 23 retains the moving region which has been detected until just before (step S211).

As seen above, by storing the coordinates of the region detected in the immediately preceding frame and providing the coordinates to a subsequent frame as potential box region information, it is possible to judge whether one frame includes a box, without having to compare multiple frames as in the first embodiment.

Thus, even when playback of the moving region is stopped, it is possible to detect a moving region which has not been detected in the moving region detection process in step S153 in FIG. 21.

The CPU 23 then judges whether it has received data on a subsequent frame (step S151 in FIG. 21) and, if it has received such data, repeats the processes of steps S153 and S155.

Specifically, the CPU 23 fails to detect a moving region in step S153 in FIG. 21, then sequentially goes through steps S201, S203, S205, and S211 in FIG. 22 during the period from time t+2 to time t+4, and retains the moving region which has been detected until just before.

Since the window is closed at time t+5, the CPU 23 fails to detect a moving region in step S153 in FIG. 21 and then proceeds to step S155. In step S155, the CPU 23 sequentially goes through steps S201, S203, and S205. In step S205, it judges that there is no box at the coordinates of the moving region which has been detected until just before and then proceeds to step S207. The CPU 23 then judges whether the case where there is no box has occurred multiple times continuously (step S207). In the present embodiment, it is assumed that the multiple times in step S207 is "5". In this case, the case where there is no box has not occurred the multiple times continuously and therefore the CPU 23 retains the moving region which has been detected until just before (step S211).

The CPU 23 then judges whether it has received data on a subsequent frame (step S151 in FIG. 21) and, if it has received such data, repeats the processes of steps S153 and S155.

Specifically, the CPU 23 fails to detect a moving region in step S153 in FIG. 21, then in step S155, goes through steps S201, S203, S205, S207, and step S211 in FIG. 22 during the period from time t+6 to time t+8, and retains the moving region which has been detected until just before.

Similarly, the CPU 23 fails to detect a moving region in step S153 in FIG. 21 and, then in step S155, goes through steps S201, S203, S205, and S207 in FIG. 22 at time t+9. In step S207, it judges whether the case where there is no box has occurred five times continuously and then discards the moving region which has been detected until just before (step S213).

Thus, even when a rectangular moving region exists but playback is stopped, the CPU 23 can detect the region for a given period of time.

In the present embodiment, when the CPU 23 detects no moving region in step S203 in FIG. 22, it performs the process of step S205. This is intended to judge whether to perform steps S221 and later. Accordingly, if only whether the movement is temporarily stopped should be judged, the CPU 23 may directly proceed to step S205 when the judgment in step S201 is "YES".

5.2 When Region is Located Inside

Hereafter, there will be described a process when only a portion of a moving region is moving and the other portions hardly move. Hereafter, there will be described an example in which the entire moving region is moving during the period from time t−20 to time t and only a portion of the face is moving during the period from time t+1 to time t+6, as described above.

At time t, the CPU 23 performs the moving region detection process of step S153 in FIG. 21. In this case, only the portion of the face is moving at time t. Accordingly, as shown in FIG. 23, a moving region 411 which is smaller than an immediately preceding moving region 410 is detected.

The CPU 23 then proceeds to step S153 in FIG. 21. Specifically, at time t, the CPU 23 judges whether there is a moving region which has been detected until just before (step S201 in FIG. 22).

Figure 23:
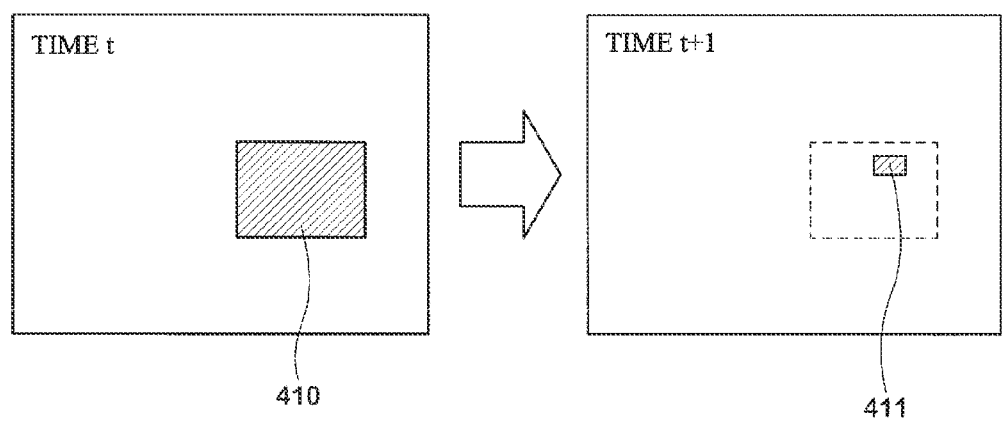
FIG. 23 is a diagram showing a state in which a moving region 411 is detected inside a moving region 410.

As shown in FIG. 23, there has been a moving region just before, that is, at t−1. Accordingly, the CPU 23 judges whether a moving region has been detected at time t (step S203). Since a moving region has been detected, the CPU 23 judges whether the detected moving region is located inside the moving region which has been detected until just before (step S221).

As shown in FIG. 23, the moving region 411, detected at time t, is included in the moving region 410, detected at time t−1. The CPU 23 then judges whether the number of times the detected moving region has continuously been detected inside the moving region which has been detected until just before is greater than or equal to a threshold (step S223). In the present embodiment, it is assumed that the threshold in step S223 is "five times".

In this case, the detected moving region has not continuously been detected inside the moving region which has been detected until just before. Accordingly, the CPU 23 judges that the number of times is smaller than the threshold and then judges whether the time over which it has retained the moving region which has been detected until just before is longer than or equal to a threshold (step S225). In the present embodiment, it is assumed that the threshold of the retaining time in step S225 is three seconds.

Since the entire moving region has moved during the period from time t−20 to time t, the CPU 23 judges that the retaining time exceeds the threshold and continues to retain the moving region which has been detected until just before (step S211). Thus, if only a portion of a moving region is moving and the other portions hardly move, it is possible to prevent the moving region from being detected erroneously.

As seen above, if the retaining time is longer than or equal to the threshold in step S225, the CPU 23 continues to retain the moving region 410, which has been detected until just before. Thus, it is possible to prevent the moving region from being detected erroneously. That is, if a moving region has been retained in the same position and with the same size for the predetermined time and if an inner portion of the moving region is detected accidentally, the CPU 23 recognizes this detection as erroneous detection and performs the process of step S211.

The CPU 23 also performs similar processes in the subsequent frames. Thus, even when the detected moving region is located inside the moving region which has been detected until just before, the original moving region can be retained.

When the retaining time of the moving region which has been detected until just before does not exceed the threshold in step S225, the CPU 23 judges whether there are no luminance changes in and around the four corners of the moving region which has been detected until just before (step S227).

In this case, only a portion of the moving region is moving and the other portions hardly move. Accordingly, the CPU 23 judges that there are no luminance changes and then proceeds to step S229 to judge whether there is a box. The process of step S229 is the same as that of step S205. Since there is a box in the moving region, the CPU 23 proceeds to step S211.

As seen above, if a portion of the moving region is moving and the other portions are standing still accidentally and if the retaining time of the moving region which has been detected until just before does not exceed the threshold, the CPU 23 can retain this moving region (step S211).

When these processes are repeated, the retaining time becomes greater than or equal to the threshold in step S225. Accordingly, the CPU 23 proceeds to step S211.

The significance of step S227 will be described. Cases where the detected moving region is located inside the moving region which has been detected until just before, as shown in FIG. 23, include the case where only a portion of the moving region is moving and the other portions hardly move, as well as a case where another window overlaps the moving region and thus partially hides it. In the latter case, at least one of the hidden portions includes one of the four corners of the detected region, and the luminance thereof changes. Accordingly, if there are luminance changes in at least one location in and around the four corners of the moving region which has been detected until just before, the CPU 23 proceeds to step S211; otherwise, it performs the process of step S229.

That is, if another window overlaps the moving region and thus partially hides it, the CPU 23 judges in step S229 that there is no box in the moving region which has been detected until just before and regards the detected moving region as a new moving region (step S231). Note that by adjusting the threshold for detecting a box, the degree of overlap can be adjusted.

Note that when there are no luminance changes in one or more locations in step S227, the CPU 23 may skip step S229 and proceeds to step S231.

Then in step S151, the CPU 23 judges whether it has received data on a subsequent frame (step S151 in FIG. 21). If it has received such data, the CPU 23 repeats the processes of steps S153 and S155.

If the number of times the detected moving region has been continuously located inside the moving region which has been detected until just before is greater than or equal to the threshold in step S223, the CPU 23 skips the judgments of steps S225 and S227 and makes the judgment of step S229.

Steps S227, S229, and S231 produce the following effects. In the initial stage of the moving region detection process, the reliability of the result is relatively low. This is because due, for example, to a movement of the mouse pointer or progress bar, the moving region is often erroneously detected so that it is larger. For this reason, during a period immediately after the moving region is detected, if there are no luminance changes in any of the four corners of the current detection region and if there is no box, the detected inner region is set as a moving region again.

In the present embodiment, whether there are no luminance changes in at least one of the four corners is judged as a judgment criterion of step S227; alternatively, whether there are no luminance changes in the four corners plus the center, that is, in a total of five locations may be judged. In this case, whether there are no luminance changes in at least one of the four corners, as well as in the center may be judged.

If the moving region has been moved or the shape thereof has been changed, for example, enlarged, it is judged in step S221 that the detected moving region is not located inside the moving region which has been detected until just before. In this case, the moving region which has been detected until just before is not retained. That is, the region detected in the normal movement detection process of step S153 in FIG. 21 is detected as a moving region.

Note that it may be judged in steps S205 and S229 whether, for example, a progress bar indicating the playback position of a moving image or a timer indicating the playback time, instead of a box, exists in the moving region which has been detected until just before. As seen above, if the detected moving region includes a box or the like, the detected region can be judged to be the moving region which has been detected until just before.

Further, whether there is a box in the moving region which has been detected until just before may be judged based on a histogram rather than the number of edges.

Figure 24:
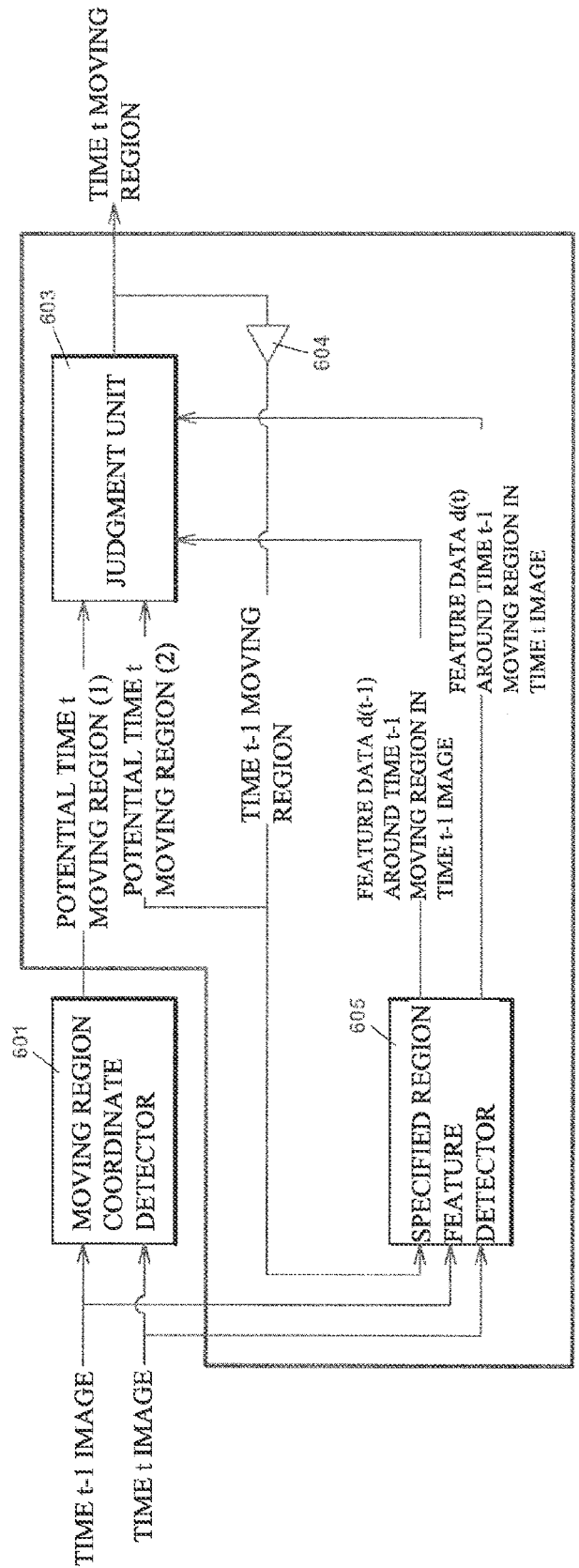
FIG. 24 is a block diagram when the processes in FIGS. 21 and 22 are performed by hardware.

FIG. 24 is a block diagram when the processes in FIGS. 21 and 22 are performed by hardware. A moving region coordinate detector 601 outputs a potential time t moving region (1) by using respective images of times t−1 and t. A judgment unit 603 selects between the potential time t moving region (1) and potential time t moving coordinates (2) (to be discussed later) and, at time t, outputs the moving region of time t. A retainer 604 retains the moving region (coordinates) of time t. At time t+1, it provides this retained moving region (coordinates) to a specified region feature detector 605 as the moving coordinates of time t and also provides this moving region (coordinates) to itself as potential time t+1 moving coordinates (2).

At time t+1, the specified region feature detector 605 applies the moving coordinates of time t provided by the judgment unit 603 to the respective images of times t and t+1 to calculate feature data d(t) around the moving coordinates of time t and feature data d(t+1) around the moving coordinates of time t+1 and then provides the calculated data to the judgment unit 603.

The judgment unit 603 judges whether there is a box, based on the feature data d(t+1). The judgment unit 603 also judges whether there are luminance changes in the four corners (step S227 in FIG. 22), based on the feature data d(t) and feature data d(t+1).

As seen above, by retaining the outputted moving coordinates of time t and applying the moving coordinates to the provided images at time t+1, the judgment in FIG. 22 can be made.

While the rectangular moving region detection method of the present embodiment has been described in combination with those of the first to fourth embodiments, it may be combined with other rectangular moving region detection methods.

The method for determining boundaries of a rectangular moving image region having a rectangular external shape displayed in part of a display region on the basis of a difference between respective frame images of times t and t+1 may include, for example, the following: a moving unit block judgment step of dividing the display region into unit blocks each including a predetermined number of pixels and judging whether each unit block is a moving unit block having a motion; a moving row block determination step of, if one row includes at least one moving unit block in a column direction in which rows are arranged, determining the row as a moving row block; a moving column block determination step of, if one column includes at least one moving unit block in a row direction in which columns are arranged, determining the column as a moving column block; and a first rectangular moving image region determination step of, when the number of adjacent moving row blocks of the moving row blocks is greater than or equal to a threshold, defining an external row block straight line of the set of adjacent row blocks, when the number of adjacent moving column blocks of the moving column blocks is greater than or equal to a threshold, defining an external column block straight line of the set of adjacent column blocks, and determining a rectangular region surrounded by the external row block straight line and the external column block straight line as a rectangular moving image region.

While the same frame image is provided to both the moving region coordinate detector 601 and the specified region feature detector 605 in the present embodiment, a frame image different from a frame image provided to the moving region coordinate detector 601 may be provided to the specified region feature detector 605. Specifically, while the inclusion relationship is judged based on the moving region obtained from the frames of times t−1 and t and the moving region obtained from the frames of times t and t+1 in the present embodiment, it may be judged based on a moving region obtained from the frames of times t and t+n and a moving region obtained from the frames of times t+m and t+p. As used herein, n, m, and p are integers satisfying n<m and p<m.

The frames of times t+a and t+b may be provided to the specified region feature detector 605. As used herein, a and b are integers satisfying m≥b, m≥a, and a≠b.

6. Sixth Embodiment

In the fourth embodiment, the scroll judgment is made on a particular moving image region; when a character region is being scrolled, the boundary judgment is not made. This scroll judgment can also be used to judge whether a particular region is a text region.

In the present embodiment, there will be described a case where whether a particular region is a text region is judged using a different method.

This method can also be used to judge whether a particular region is being scrolled.

Figure 25:
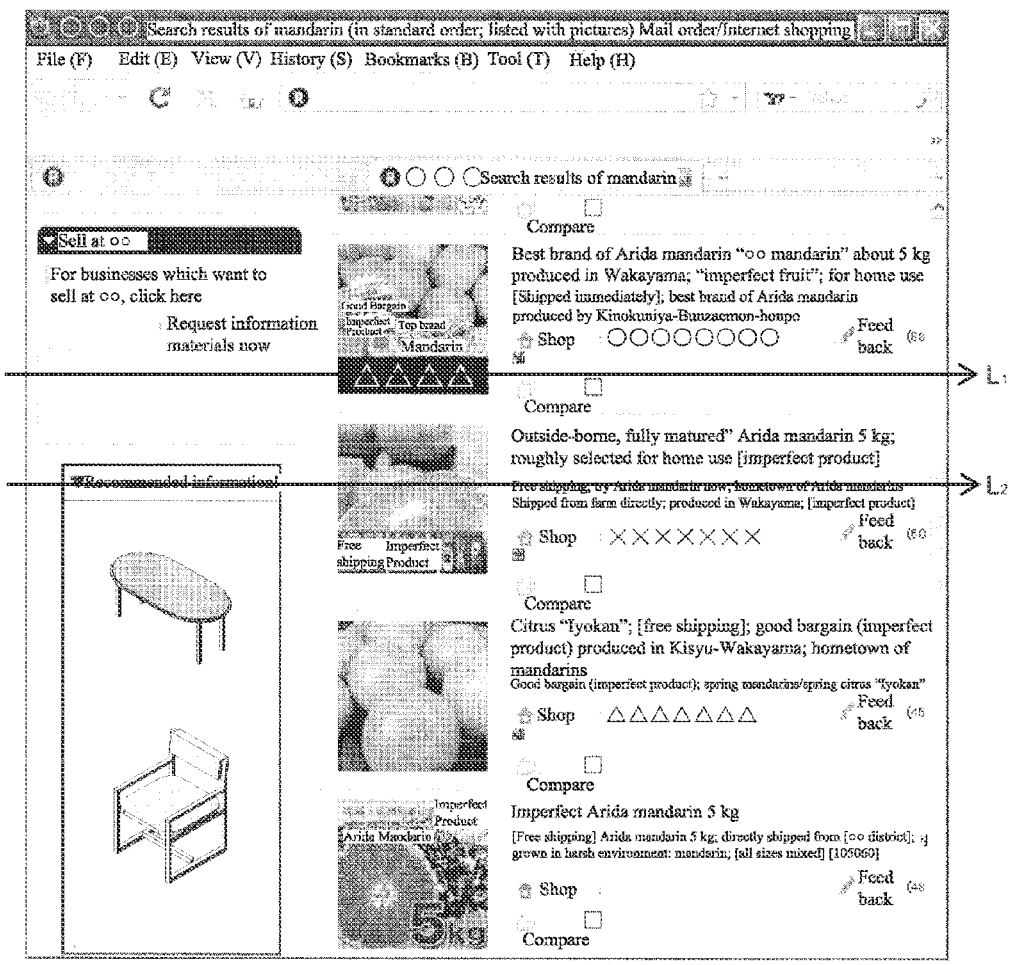
FIG. 25 is an example of a document image.
Figure 26:
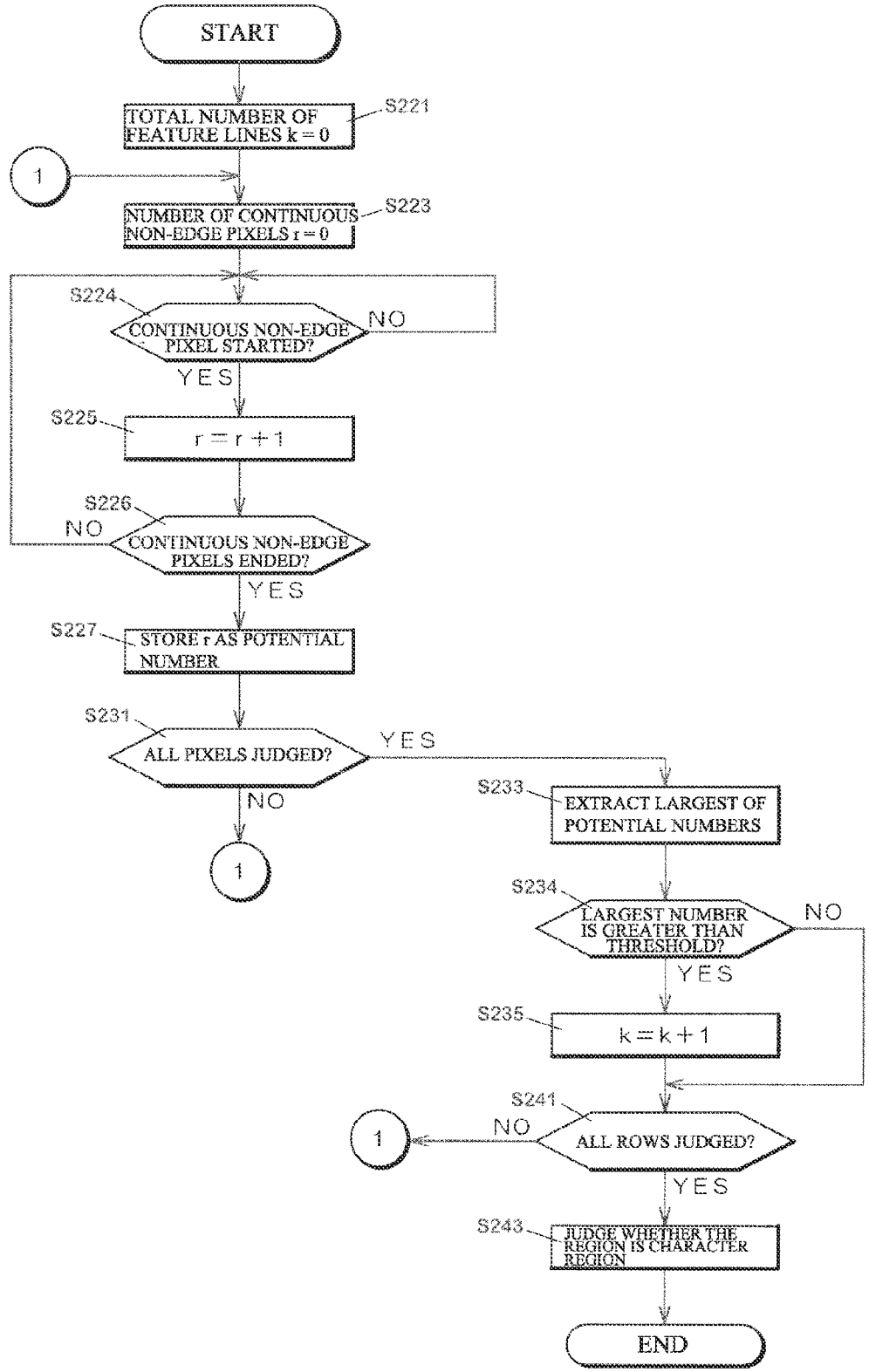
FIG. 26 is a flowchart showing a character region judgment process of a sixth embodiment.

In the fourth embodiment, when the difference in edge number between each line and the immediately preceding line exceeds the threshold, the line is detected as a feature line; and when the total number of feature lines detected exceeds the threshold, the particular rectangular region is judged to be a character region. However, a character-incorporated region in which natural images and characters are mixed, as shown in FIG. 25, may be erroneously detected. The reason is that there is no difference in edge number between each line and the immediately preceding line in the natural-image regions and therefore whether each line is a feature line must be judged using only other regions. In the present embodiment, on the other hand, whether a region is a character-incorporated region is judged based on whether the largest continuous non-edge pixel number included in each line is greater than or equal to a threshold rather than based on the difference in edge number between two lines. This judgment process will be described using the rectangular region where characters and natural images are mixed, shown in FIG. 25, and with reference to FIG. 26.

The CPU 23 initializes the total number of feature lines, k, (step S221 in FIG. 26) and then initializes the number of continuous non-edge pixels, r, (step S223).

The CPU 23 then judges whether a continuous non-edge pixel has started (step S224). Whether a continuous non-edge pixel has started may be judged based on whether the pixel is the first non-edge pixel in the row or has changed from an edge pixel to a non-edge pixel. As described above, whether each pixel is an edge may be judged based on the difference in luminance between the pixel and an adjacent pixel.

If the judgment in step S224 is "YES", the CPU 23 increments the number of continuous non-edge pixels r (step S225) and judges whether the continuous non-edge pixels have ended (step S226). Whether the continuous non-edge pixels have ended may be judged based on whether the pixel has changed from a non-edge pixel to an edge pixel or whether the last pixel in the line is a non-edge pixel.

The CPU 23 stores the current r as a potential continuous non-edge pixel number (step S227).

The CPU 23 then judges whether judgments have been made on all pixels in the line (step S231). If judgments have not been made on all pixels, the CPU 23 repeats steps S223 to S227.

If the judgment in step S224 is "NO", the CPU 23 repeats the process of step S224.

Thus, one or more potential continuous non-edge pixel numbers are stored for each row.

If the CPU 23 judges in step S231 that judgments have been made on all pixels in the row, it extracts the largest of the potential continuous non-edge pixel numbers (step S233) and then deletes all the potential numbers. The CPU 23 then judges whether the largest number extracted is greater than a threshold (step S234).

While 40% or more of the number of pixels in the horizontal direction in a particular region is set to the threshold of step S234 in the present embodiment, the threshold is not limited thereto.

Thus, for example, row L1 in FIG. 25 is judged to be a feature line. On the other hand, row L2 is not judged to be a feature line.

If the largest number is greater than the threshold, the CPU 23 increments the total number of feature lines k (step S235). The CPU 23 then judges whether judgments have been made on all rows (step S241). If judgments have not been made on all rows, the CPU 23 repeats steps S223 and later.

If the CPU 23 judges in step S241 that judgments have been made on all rows, it judges whether the region is a character region (step S243).

In the present embodiment, it is assumed that if the total number of feature lines k is greater than a threshold thk, the region is judged to be a character region. The threshold thk may be any value and, in the present embodiment, is set to 30% of the number of all rows in the region.

In the present embodiment, if the largest continuous non-edge pixel number is greater than the threshold, the row is judged to be a feature line. For this reason, if image data including natural images includes text, continuous non-edge pixels can be present in the largest number, since there are inter-row spaces. As seen above, by noting the largest continuous non-edge pixel number, even an image where a natural image and an image having characters on a relatively flat background are horizontally mixed, as shown in FIG. 25, is prevented from being erroneously judged to be a non-character region.

By making this character region judgment, it is possible to prevent the region from being judged to be a moving image when characters in the browser are being scrolled, as in the fourth embodiment. This scroll judgment may be made on some rows in the region rather than on all rows in the region.

While the case where text data is written horizontally has been described in the present embodiment, this judgment is also applicable to vertically written text data. Further, the judgment is applicable to any languages.

Note that the scroll judgment method is not limited to that described above and may be well-known methods.

While the case where the present embodiment is applied to the scroll judgment in the moving image region judgment process has been described, the present embodiment is also applicable to scroll judgment in general.

The present embodiment also provides an apparatus for judging whether a target region to be judged in a screen is a scrolled region. The apparatus includes: edge pixel judgment means configured to judge whether each pixel in the target region is an edge, based on the difference in value between the pixel and an adjacent pixel; character gap region judgment means configured to judge that a row or column including a predetermined number of continuous pixels which do not form edges is a character gap region; and scroll region judgment means configured to judge whether the target region is a scrolled region, based on the ratio of the character gap region to the target region.

Thus, it is possible to reliably judge whether an image including characters is being scrolled. This scroll judgment method may be optionally combined with the invention disclosed in the present embodiment.

The present embodiment also provides an apparatus for judging whether a target region to be judged in a screen is a character-incorporated region. The apparatus includes: edge pixel judgment means configured to judge whether each pixel in the target region is an edge, based on the difference in value between the pixel and an adjacent pixel; character gap region judgment means configured to judge that a row or column including a predetermined number of continuous pixels which do not form edges is a character gap row or character gap column; and character-incorporated region judgment means configured to judge whether the target region is a character-incorporated region, based on the ratio of the character gap region to the target region.

Thus, whether the target region is a character-incorporated region can be reliably judged. This character-incorporated region judgment apparatus may be optionally combined with methods other than the rectangle region detection method disclosed in the present embodiment.

After the target region is judged to be a potential moving region and then judged to be a scrolled region, the scroll region judgment apparatus of the present embodiment may judge that the target region is not a moving image region.

7. Other Embodiments

While the luminance value is used as the pixel value in the above embodiments, the RGB values or the like may be used.

In the above embodiment, whether the block is a block included in a moving image region is judged based on the frames of times t and t+1 in step S15 in FIG. 5. However, other frames may be used as long as there is a time difference between the frames. For example, the judgment may be made based on whether there is a movement between the frames of times t and t+2. Instead of between two frames, a comparison may be made among more frames obtained by adding preceding and following frames.

While the same frame image is provided to the moving region coordinate detector 601 and the specified region feature detector 605 in the above embodiment, different frame images may be provided. For example, the frame images of times t and t+3 and the frame images of times t+1 and t+2 may be provided to the moving region coordinate detector 601 and the specified region feature detector 605, respectively.

In other words, the frame images of times t and t+n and the frame images of times t+a and t+b may be provided to the moving region coordinate detector 601 and the specified region feature detector 605, respectively. As used herein, a, b, and n are integers satisfying n≥b>a≥0.

In this case, the specified region feature detector 605 applies, at time t+1, the moving coordinates of time t provided by the judgment unit 603 to the respective images of times t+a and t+b to calculate feature data d(t+a) around the moving coordinates of time t and feature data d(t+b) around the moving coordinates of time t+b and then provides the calculated data to the judgment unit 603.

The judgment unit 603 judges whether there is a box, based on the feature data d(t+b). The judgment unit 603 also judge whether there are luminance changes in the four corners, based on the feature data d(t+a) and feature data d(t+b).

In the above embodiments, the boundary determination process of step S9 in FIG. 3 is optional. If a pixel-based boundary is not necessary, this process does not need to be performed. In the above boundary determination process, the values of all pixels in one row or one column with respect to all peripheral blocks are used. Alternatively, the pixel values may be thinned out, or a representative value may be used. Further, a judgment may be made based on some peripheral blocks rather than all peripheral blocks.

As in step S15 in FIG. 5, a representative value of the past same position may be stored in advance and used for a comparison.

In the above embodiments, one block includes 32*32 pixels but not limited thereto.

If the value of any pixel (e.g., the value of the pixel at the upper-left corner of the block) is used as it is in place of the average value or hash value of the pixel, the boundaries may be obtained in the process of step S9 in FIG. 3 by arranging pixels corresponding to one block on the periphery. For example, if 7*5 blocks are detected as a moving image region in the process of step S7, the process of step S9 is performed based on 9*7 blocks obtained by adding one block to around the blocks.

A monitor or set-top box including the rectangular moving image region determination apparatus of the above embodiment may be formed. Such a set-top box may be formed as a switching hub for switching between input data destination monitors.

In the above embodiments, a rectangular moving image region can be detected with pixel-level accuracy. Further, multiple rectangular moving image regions can be determined. Furthermore, movements of a small-width region can be eliminated. For example, quasi-movements of the mouse pointer or the like can be addressed. Since such movements can be distinguished from moving and still regions in an image, optimal control can be performed.

In the above embodiments, whether each unit block is a moving unit block is judged by: dividing the display region into unit blocks each including a predetermined number of pixels and calculating a representative value of each unit block on the basis of the values of the predetermined number of pixels included in the unit block; comparing the calculated representative value of each unit block with a representative value of a unit block in the same position in a comparative frame; and if the difference between the representative values exceeds the threshold, judging that the unit block is a moving unit block having a motion. However, the method for judging whether each unit block is a moving unit block is not limited to that described above and may be other methods. For example, as described above, there may be used any well-known moving unit block judgment method, such as a comparison among the sums of the representative values of the same block in a predetermined number of frames.

In the above embodiments, the functions shown in FIG. 1 are achieved by using the CPU 23 and executing software. Alternatively, some or all of the functions may be achieved by using hardware, such as a logic circuit. Further, part of the program may be executed by the operating system (OS).

DESCRIPTION OF NUMERALS

23 CPU
25 RAM
26 flash memory

The invention claimed is:

1. A method for determining boundaries of a rectangular moving image region having a rectangular external shape displayed in part of a display region on the basis of a difference between respective frames of times t and t+n, the method comprising:
   determining, by a rectangular moving image region determination means, if a rectangular moving image region in the frame of time t, retaining by a boundary coordinate retaining means, the boundary coordinates of the rectangular moving image region; and
   judging, by a box judgment means, whether there is a box at the boundary coordinates of the rectangular moving image region of time t in a frame of time t+m, without using the frame of time t and, if there is a box, providing, by a region judgment means, a region specified by the boundary coordinates of the rectangular moving image region of time t to a moving region in the frame of time t+n, wherein n≥m.

2. The method of claim 1, wherein pixels are arranged in row and column directions in the display region, and wherein the rectangular moving image region in the frame of time t is determined by:
   a moving unit block judgment step of dividing the display region into unit blocks each including a predetermined number of pixels and judging whether each unit block is a moving unit block having a motion;
   a moving column block determination step of defining, as a column block, a set of unit blocks included in a column including one of uppermost unit blocks of the unit blocks and, if one column block includes at least one moving unit block, determining the column block as a moving column block;
   a moving row block determination step of defining, as a row block, a set of unit blocks included in a row including one of leftmost unit blocks of the unit blocks and, if one row block includes at least one moving unit block, determining the row block as a moving row block; and
   a first rectangular moving image region determination step of determining, as a rectangular moving image region, a rectangular region specified by unit blocks included in both the moving row block and the moving column block.

3. The method of claim 2, wherein the rectangular moving image region in the frame of time t is further determined by a second rectangular moving image region determination step of determining a region defined by edges of the rectangular moving image region as the rectangular moving image region on the basis of pixels in unit blocks forming peripheral four sides, of the unit blocks forming the rectangular moving image region.

4. The method of claim 3, wherein the second rectangular moving image region determination step further comprises:
   determining a row having a different representative pixel value in the unit blocks forming the peripheral four sides as a row-direction boundary of the rectangular moving image region and determining a column having a different representative pixel value in the unit blocks forming the peripheral four sides as a column-direction boundary of the rectangular moving image region.

5. The method of claim 3, wherein the second rectangular moving image region determination step further comprises:
   extracting pixels serving as row-direction edges and pixels serving as column-direction edges from pixels in the unit blocks forming the peripheral four sides and determining boundaries of the rectangular moving image region on the basis of the total number of pixels serving as row-direction edges in each row and the total number of pixels serving as column-direction edges in each column.

6. The method of claim 2, wherein the first rectangular moving image region determination step further comprises:
   when the number of adjacent moving row blocks of the moving row blocks is greater than or equal to a threshold, defining an external row block straight line of the set of adjacent row blocks;
   when the number of adjacent moving column blocks of the moving column blocks is greater than or equal to a threshold, defining an external column block straight line of the set of adjacent column blocks; and
   determining a rectangular region surrounded by the external row block straight line and the external column block straight line as a rectangular moving image region.

7. The method of claim 2, wherein the first rectangular moving image region determination step further comprises:
   repeatedly performing the moving column block determination step and the moving row block determination step on the determined rectangular region.

8. The method of claim 1, further comprising:
   if no moving region is detected from the frames of times t and t+n, judging whether there is a box at the boundary coordinates of the rectangular moving image region of time t in a frame of time t+b, without using the frame of time t and, if there is a box, judging that the region specified by the boundary coordinates of time t is a moving region in the frame of time t+n;
   if moving regions are detected from the frames of times t and t+n, determining a rectangular moving image region in the frame of time t+n on the basis of the frames of times t and t+n and judging whether the determined rectangular moving image region in the frame of time t+n is included in the region specified by the boundary coordinates of time t; and
   if the determined rectangular moving image region in the frame of time t+n is included, judging whether there is a box at the boundary coordinates of the rectangular moving image region of time t in the frame of time t+b, without changing using the frame of time t and, if there is a box, judging that the region specified by the boundary coordinates of time t is a moving region in the frame of time t+n, wherein b and n are integers satisfying n≥b≥1.

9. The method of claim 8, wherein if the number of times the determined rectangular moving image region in the frame of time t+n is continuously included in the region specified by the boundary coordinates of the rectangular moving image region of time t is greater than or equal to a threshold, whether there is a box at the boundary coordinates of the rectangular moving image region of time t in the frame of time t+b is judged without using the frame of time t.

10. The method of claim 1, wherein pixels are arranged in row and column directions in the display region, and wherein the rectangular moving image region in the frame of time t is determined by:
   an edge pixel judgment step of judging pixels forming edges on the basis of values of target pixels to be judged;
   a row-direction boundary determination step of extracting pixels forming row-direction edges as row-direction edge pixels, calculating the total number of the row-direction edges in each row, and determining a row-direction boundary on the basis of the total number of the row-direction edge pixels in the respective rows;
   a column-direction boundary determination step of extracting pixels forming column-direction edges as column-direction edge pixels, calculating the total number of the column-direction edges in each column, and determining a column-direction boundary on the basis of the total number of the column-direction edges in the respective columns; and
   a rectangular region determination step of determining the determined row-direction and column-direction boundaries as boundaries of the rectangular region.

11. The method of claim 10, wherein the edge pixel judgment step further comprises:
   1) dividing a display region into unit blocks each including a predetermined number of pixels, the display region having pixels arranged in row and column directions therein, and judging whether each unit block is a moving unit block having a motion;
   2) defining, as a column block, a set of unit blocks included in a column including one of uppermost unit blocks of the unit blocks and, if one column block includes at least one moving unit block, determining the column block as a moving column block;
   3) defining, as a row block, a set of unit blocks included in a row including one of leftmost unit blocks of the unit blocks and, if one row block includes at least one moving unit block, determining the row block as a moving row block;
   4) determining, as a rectangular moving image region, a rectangular region specified by unit blocks included in both the moving row block and the moving column block; and
   5) determining, as the target pixels, pixels included in unit blocks forming peripheral four sides, of the unit blocks included in the rectangular moving image region.

12. An apparatus for determining boundaries of a rectangular moving image region having a rectangular external shape displayed in part of a display region on the basis of a difference between respective frames of times t and t+n, the apparatus comprising:
   means configured to determine a rectangular moving image region in the frame of time t;
   boundary coordinate retaining means configured to retain coordinates of boundaries of the determined rectangular moving image region;
   box judgment means configured to judge whether there is a box at the boundary coordinates of the rectangular moving image region of time t in a frame of time t+m, without using the frame of time t; and
   region judgment means configured to, if the box judgment means judges that there is a box, provide a region specified by the boundary coordinates of the rectangular moving image region of time t to a moving region in the frame of time t+n, wherein n?m.

13. A monitor comprising the apparatus of claim 12.

14. A set-top box comprising the apparatus of claim 12.

15. A method for determining boundaries of a rectangular moving image region having a rectangular external shape displayed in part of a display region on the basis of a difference between respective frames of times t and t+n, the method comprising:
   if a rectangular moving image region of time t+n is determined, by a rectangular moving image region determination means, based on the frames of times t and t+n, retaining, by a boundary coordinate retaining means, coordinates of boundaries of the rectangular moving image region of time t+n;
   if a rectangular moving image region in a frame of time t+m is determined based on respective frames of times t+p and t+m, judging whether the rectangular moving image region in the frame of time t+m is included in a region specified by the boundary coordinates of the rectangular moving image region of time t+n;
   if the rectangular moving image region in the frame of time t+m is included, judging, by a box judgment means, whether there is a box at the boundary coordinates of the frame of time t+n in a frame of time t+b, without using the frame of time t+n; and
   if there is a box, judging, by a region judgment means, whether the region specified by the boundary coordinates of time t+n is a moving region in the frame of time t+m, wherein
   m, n, p, and b are integers satisfying n<m, p<m, and b≤m.

* * * * *